US007752122B2

(12) United States Patent
Friesen et al.

(10) Patent No.: US 7,752,122 B2
(45) Date of Patent: *Jul. 6, 2010

(54) USER INTERFACE FOR AN ELECTRONIC TRADING SYSTEM

(75) Inventors: Richard W. Friesen, Fairfax, CA (US); Peter C. Hart, San Rafael, CA (US)

(73) Assignee: Trading Technologies International, Inc., Chicago, IL (US)

( * ) Notice: Subject to any disclaimer, the term of this patent is extended or adjusted under 35 U.S.C. 154(b) by 996 days.

This patent is subject to a terminal disclaimer.

(21) Appl. No.: 11/417,546

(22) Filed: May 3, 2006

(65) Prior Publication Data

US 2006/0265319 A1 Nov. 23, 2006

Related U.S. Application Data

(63) Continuation of application No. 09/289,550, filed on Apr. 9, 1999, now Pat. No. 7,212,999.

(51) Int. Cl.
*G06Q 40/00* (2006.01)

(52) U.S. Cl. .......................................... 705/37; 705/35

(58) Field of Classification Search .................. 705/37, 705/35
See application file for complete search history.

(56) References Cited

U.S. PATENT DOCUMENTS 4,674,044 A 6/1987 Kalmus et al. .............. 364/408

(Continued)

FOREIGN PATENT DOCUMENTS

| | | |
|---|---|---|
| EP | 388162 | 9/1990 |
| JP | 6028384 | 2/1994 |
| JP | 2004287819 | 10/2004 |
| WO | 92/12488 | 7/1992 |
| WO | WO 92/12488 | 7/1992 |
| WO | WO 95/26005 A1 | 9/1995 |
| WO | WO 00/52619 A1 | 9/2000 |
| WO | WO 01/75733 | 11/2001 |

OTHER PUBLICATIONS

Wright, William, Research Report Information Animation Applications in the Capital Markets, IEEE 1995.

(Continued)

*Primary Examiner*—Hani Kazimi
(74) *Attorney, Agent, or Firm*—McDonnell Boehnen Hulbert & Berghoff LLP

(57) ABSTRACT

A user interface for an electronic trading exchange is provided which allows a remote trader to view in real time bid orders, offer orders, and trades for an item, and optionally one or more sources of contextual data. Individual traders place orders on remote client terminals, and this information is routed to a transaction server. The transaction server receives order information from the remote terminals, matches a bid for an item to an offer for an item responsive to the bid corresponding with the offer, and communicates outstanding bid and offer information, and additional information (such as trades and contextual data) back to the client terminals. Each client terminal displays all of the outstanding bids and offers for an item, allowing the trader to view trends in orders for an item. A priority view is provided in which orders are displayed as tokens at locations corresponding to the values of the orders. The size of the tokens reflects the quantity of the orders. An alternate view positions order icons at a location which reflects the value and quantity of the order. Additionally, contextual data for the item is also displayed to allow the trader to consider as much information as possible while making transaction decisions. A pit panel view is also provided in which traders connected to the pit are represented by icons, and are displayed corresponding to an activity level of the trader.

19 Claims, 11 Drawing Sheets

U.S. PATENT DOCUMENTS 4,750,135 A 6/1988 Boilen
4,799,156 A 1/1989 Shavit et al. ................ 364/401
4,823,265 A 4/1989 Nelson
4,903,201 A 2/1990 Wagner
5,038,284 A 8/1991 Kramer
5,077,665 A 12/1991 Silverman et al.
5,101,353 A 3/1992 Lupien et al.
5,136,501 A 8/1992 Silverman et al.
5,270,922 A 12/1993 Higgins
5,297,031 A 3/1994 Gutterman et al. .......... 364/408
5,297,032 A 3/1994 Trojan et al. ................ 364/408
5,347,452 A 9/1994 Bay, Jr.
5,375,055 A 12/1994 Togher et al. .............. 364/408
5,619,631 A 4/1997 Schott
5,675,746 A 10/1997 Marshall
5,689,651 A 11/1997 Lozman ...................... 395/237
5,774,877 A 6/1998 Patterson, Jr. et al.
5,793,301 A 8/1998 Patterson, Jr. et al.
5,797,002 A 8/1998 Patterson, Jr. et al.
5,844,572 A 12/1998 Schott
5,845,266 A 12/1998 Lupien et al.
5,915,245 A 6/1999 Patterson, Jr. et al.
5,924,082 A 7/1999 Silverman et al.
5,924,083 A 7/1999 Silverman et al.
5,946,666 A 8/1999 Nevo et al.
5,946,667 A 8/1999 Tull, Jr. et al.
5,963,923 A 10/1999 Garber
5,966,139 A 10/1999 Anupam et al.
6,012,046 A 1/2000 Lupien et al.
6,014,643 A 1/2000 Minton
6,035,287 A 3/2000 Stallaert et al.
6,061,660 A 5/2000 Eggleston et al.
6,098,051 A 8/2000 Lupien et al.
6,101,484 A 8/2000 Halbert et al.
6,131,087 A 10/2000 Luke et al.
6,134,535 A 10/2000 Belzberg
6,161,099 A 12/2000 Harrington et al.
6,188,403 B1 2/2001 Sacedoti et al.
6,195,647 B1 2/2001 Martyn et al.
6,211,873 B1 4/2001 Moyer
6,272,474 B1 8/2001 Garcia
6,282,521 B1 8/2001 Howorka
6,408,282 B1 6/2002 Buist
6,418,419 B1 7/2002 Nieboer et al.
6,766,304 B2 7/2004 Kemp
6,772,132 B1 8/2004 Kemp
6,993,504 B1 1/2006 Friesen
7,212,999 B2 5/2007 Friesen
7,412,416 B2 8/2008 Friesen et al.
2001/0034696 A1 10/2001 McIntyre
2001/0039527 A1 11/2001 Ordish et al.
2002/0023038 A1 2/2002 Fritsch et al.
2002/0130868 A1 9/2002 Smith
2002/0138390 A1 9/2002 May
2002/0178096 A1 11/2002 Marshall
2003/0009411 A1 1/2003 Ram et al.
2003/0126068 A1 7/2003 Hauk et al.
2004/0099933 A1 5/2004 Kimura
2005/0125328 A1 6/2005 Schluetter
2005/0256799 A1 11/2005 Warsaw et al.
2006/0010066 A1 1/2006 Rosenthal et al.
2006/0020538 A1 1/2006 Ram
2006/0059083 A1 3/2006 Friesen
2006/0259405 A1 11/2006 Friesen
2006/0259410 A1 11/2006 Friesen
2006/0259413 A1 11/2006 Friesen
2006/0265315 A1 11/2006 Friesen
2006/0265318 A1 11/2006 Friesen

OTHER PUBLICATIONS

Tokyo Stock Exchange ("TSE"), Publication 1, Sep. 1997.
TSE, "Publication 2", Aug. 1998.
TSE, "Publication 3", Jul. 31, 2000.
TSE, Document 1, Jan. 2000.
English Translation of TSE "Publication 1".
English Translation of TSE "Publication 2".
English Translation of TSE "Publication 3".
English Translation of TSE Document 1.
REFCO English Translation of TSE "Publication 1".
REFCO English Translation of TSE "Publication 2".
REFCO English Translation of TSE "Publication 3".
GL Trade, LIFFE Connect for Futures User Guide V4.50, (alleged) Feb. 1999.
GL Trade, LIFFE Connect for Futures User Guide V4.50, (alleged) Mar. 1999.
GL Trade, LIFFE Connect for Futures User Guide V4.51, (alleged) Jun. 1999.
GL Trade, LIFFE Connect for Futures User Guide V4.50 Beta, (alleged) Jan. 1999.
GL Trade, CAC and STOXX Futures on MAATIF NSC VF, (alleged) Launch: Mar. 15, 1999 pp. 1-14.
"How the Future Market Works", Jake Bernstein, 1989 New York Insitute of Finance, pp. 62-27.
Dictionary of Finance and Investment Terms, John Downes and Jordan Elliott Goodman, 1998. Barrons Education Services, Inc., p. 329.
Java Island, copyright 1999 (printed from http://www.isld.com on Jun. 11, 1999).
Search Report for PCT/US 00/09369.
Kharouf, Jim and Carla Cavaletti; "A Trading Room With a View"; Futures; Nov. 1998; 6 pages. www.futuresmag.com.
USPTO Presentation regarding The NASDAQ Stock Market, Inc.; dated Nov. 8, 2001; 15 pages.
Yahoo! Finance—Option Chain SUNW; 2 pages.
APT Brochure, LIFFE Exchange, circa 1990*.
Trading Screen, INTEX of Bermuda, circa 1984*.
Weber, Information Technology in the Major International Financial Markets, Apr. 7, 1993.
Trading Screen, TIFFE Exchange, circa 1989-1990*.
Trading Screen, MEFF Exchange, circa 1990*.
Cavaletti, Order Routing Article, Futures Magazine, Feb. 1997.
Aurora Article, CBOT, circa 1989*.
One Click Trading Options, Trading Technologies, circa 1998.
Trading Screen, SWX Exchange, circa 1990*.
Expanding futures and options trading around the world, around the clock, GLOBEX, circa 1989*.
Hansell, The computer that ate Chicago, Institutional Investor, Feb. 1989.
Globex Report: An update on the CME Global electronic exchange, Feb. 10, 1989.
NYMEX Access Documents, New York Mercantile Exchange, Feb. 28, 1992.
CATS Traders' Manual, Toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
CATS Traders' Manual, Toronto Stock Exchange, Sep. 30, 1977.

350
BUY
Price: $35.90
Quantity: 40
Value: $1436.00
Expires: End of trading day
OK Cancel
FIG. 3D
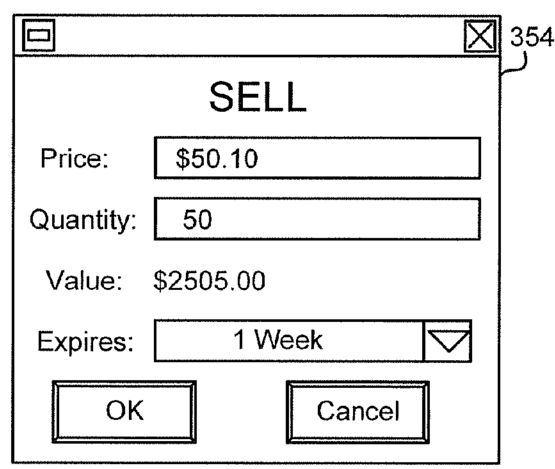
FIG. 3E
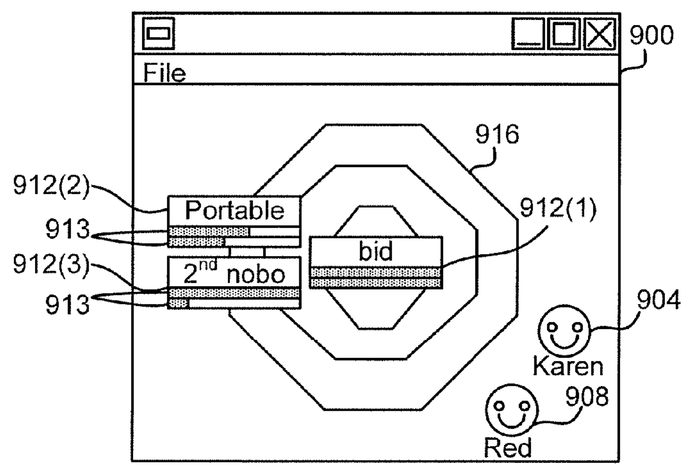
FIG. 9

USER INTERFACE FOR AN ELECTRONIC TRADING SYSTEM

CROSS REFERENCE TO RELATED APPLICATION

This application is a continuation of U.S. patent application Ser. No. 09/289,550 filed Apr. 9, 1999 now U.S. Pat. No. 7,212,999 entitled "User Interface for an Electronic Trading System" the contents of which are fully incorporated herein by reference.

TECHNICAL FIELD

The present invention relates generally to the field of graphical user interfaces and more particularly to the field of graphical user interfaces for electronic trading systems.

BACKGROUND OF THE INVENTION

Trading pits are the lifeblood of a market economy. Quantities of goods and shares in companies are bought and sold by millions of investors through trading pits on exchanges everyday. When a particular trading product or item is more valued, the value of the item is driven up as a result of more aggressive bidding by the buyers. When an item is less valued, the value of the item is driven down as a result of more aggressive offers to sell the item. The successful trader anticipates the rise or fall of the value of an item and performs his or her own transaction before the rest of the market is aware of the item's potential gain or loss in value. Thus, anticipation of the market and specifically of the future demand for an item of interest is critical to the success of a trader.

The transactions for each item occur in a trading pit for that item. The trading pit is a designated area in an exchange in which the customers submit their orders, either bids or offers, for the item to a broker in the pit. The exchange records all transactions and relays or posts to the individual traders the outstanding bid having the highest value and the outstanding offer having the lowest value for the item, along with the quantity specified in the order. The exchange does not release information on all outstanding offers and bids to the traders because, in part, this information is what gives the market makers an advantage over the traders and enables the market makers to change their own trading directions quickly, step in front of customer orders, and use customer limit orders to protect the market makers from losses. However, for an individual trader, having only the latest order information for an item complicates the trader's task of ascertaining trends in the orders for an item because the trader has very little information about the volume of offers and bids or the rate at which these volumes are changing.

Other information is also used by the trader to anticipate the market, including current exchange performances, historical transaction data for the item, the number of traders at the pit, and the trader's sense of the activity of the pit. However, it is often difficult for a trader to quickly assemble this information from diverse and often unrelated sources or even effectively process all of this information in order to make an informed transaction decision. From this information, and other external information, the trader must attempt to determine trends in the buying or selling for the item in order to anticipate the market and the demand for a particular item.

Thus, a system is needed in which trend information of market demand for an individual item is provided to traders in an intuitive format which allows traders to quickly interpret how market demand is changing to an item. A system is also needed which provides contextual information about the item or the market to the trader while the trader is trading on a specific item in a manner which allows the trader to quickly interpret the information and then act accordingly.

SUMMARY OF INVENTION

The present invention is a user interface for an electronic trading system that allows a remote trader to view trends in the orders for an item, and provides the trading information in an easy to see and interpret graphical format. The user interface of the present invention operates in a system in which individual traders place orders including bids and offers, on remote client terminals, and this information is routed to a transaction server. The transaction server receives order information from the remote terminals, matches a bid for an item to an offer for an item responsive to the bid corresponding with the offer, and communicates outstanding bid and offer information back to the client terminals. Thus, in accordance with the present invention, each client terminal displays all of the outstanding bids and offers for an item, in contrast to the conventional systems and methods in which only the highest bid and lowest offer were known to the individual trader. This allows the trader to view trends in orders for an item, and thus better enables the trader to anticipate demand for the item.

For example, in one embodiment, a graph is formed with a value axis. Bid icons and offer icons for all outstanding bids and offers are displayed on the graph at locations corresponding to the values of the bids and offers. When an item is being "bid up," i.e., the demand for the item is growing, all of the new bids are displayed to the remote trader. The trader immediately sees the increasing demand for the item as it occurs, and thus may infer that the item may rise in value, and can enter an order to buy for the item immediately while the value for the item still appears low. In contrast, in conventional systems, the trader only knew of the existence of the highest bid, and therefore would not know that demand for the item % vas increasing. However, by "opening the book," all of the outstanding orders are displayed to all of the remote traders and each trader is able to immediately see the growing demand and maximize his or her position in the market accordingly.

The user interface of the present invention presents this information in an intuitive format, allowing the trader to make informed decisions quickly. In a priority view embodiment, bid and offer icons are displayed corresponding to an axis of values. This results in the bid icons being displayed on the lower portion of the screen and the offer icons being displayed on the upper portion of the screen. The trader is able to discern immediately the number and volume of bids and offers outstanding for the item and their difference in value. The bids and offers are preferably displayed in different colors, shapes, or other visual characteristics, further enhancing the trader's ability to quickly ascertain the current state of the market. The screen is updated frequently to display the most recent bids and offers. In one embodiment, the icons are formed having an edge which is angled toward the axis of values. When all outstanding offers and bids are displayed, the arrangement of icons naturally forms the edges of a triangle that points to the value differential at the axis of values. In yet another embodiment, the trader's own bids and offers are displayed in a first color or other visual characteristic, and the bids and offers of other traders are displayed in a second color or visual characteristic. This allows the trader to quickly determine his or her relative position in the marketplace. Finally, in a preferred embodiment, a size of the icons represents the quantity of the bid or offer, allowing an easy visual means of determining the relative quantities each bid and offer represent.

In a value/quantity view embodiment, an axis of values and an axis of quantities are used to determine the location of the bid and offer icons. The icons in this embodiment are markers or tokens and provide a different look and feel to the trader. Providing alternate views allow a trader to select a view with which the trader is most comfortable trading.

A value quantifying analytic is displayed in a further embodiment with respect to the value axis at a location corresponding to the current value which the analytic represents. The analytic is preferably displayed as a marker called an action line, in a color or other visual characteristic different from the other characteristics used to represent other objects being displayed. The action line is selected by each individual trader and can reflect value-to-earning ratio, volatility, volume of sales, or any other metric the trader designs, or can be selected from a listed of predetermined metrics. The action line responds to changes in the data it measures, updating in essentially real time. The action line allows the trader to immediately determine the current valuation of the item relative to the trader's own valuation of the item. As the offers or bids approach the action line, the trader is prepared to complete a transaction in accordance with the trader's own valuation.

In another aspect of the invention, market data and other contextual data is displayed while the trader is viewing one of the aforementioned user interfaces. A historical chart is displayed in the background of a user interface to provide additional information to the trader who is determining the state of the market and how it may affect the value of the item. For example, the historical chart may represent the various market indices, historical values of the item or others, and any other historical value, quantity, or volume trend. The historical chart can represent the average value of the item over a period of time, or may represent a value or values for any other item or group of items. The historical chart is displayed with respect to a vertical axis of values, and is displayed horizontally responsive to time. The historical chart is updated to provide the latest information to the trader while the trader is trading. Thus, in accordance with the present invention, the trader is able to make instantaneous decisions regarding an item while receiving critical information about other items or the past performance of the current item and other indices. This is a major advantage over conventional methods of trading in which this information is not provided concurrently, and if presented at all, is difficult to process quickly.

An alternate embodiment provides a trading pit view that displays trader icons for each trader and positions the trader icons reflective of the activity level of the trader. Floor brokers and other bystanders are also displayed and identified to allow the trader to understand at a glance the respective positions and activity of all users currently connected to the transaction server for that trading pit. Selecting a trader icon provides information regarding the trader and can open up a window to allow the traders to communicate with each other using one or more methods including electronic mail, text chat or communication by voice over a network connection. The trading pit view allows the remote trader to immediately ascertain whom the trader is trading against, how active they are, and allows the trader to better anticipate the market.

DETAILED DESCRIPTION OF THE PREFERRED EMBODIMENT

Figure 1:
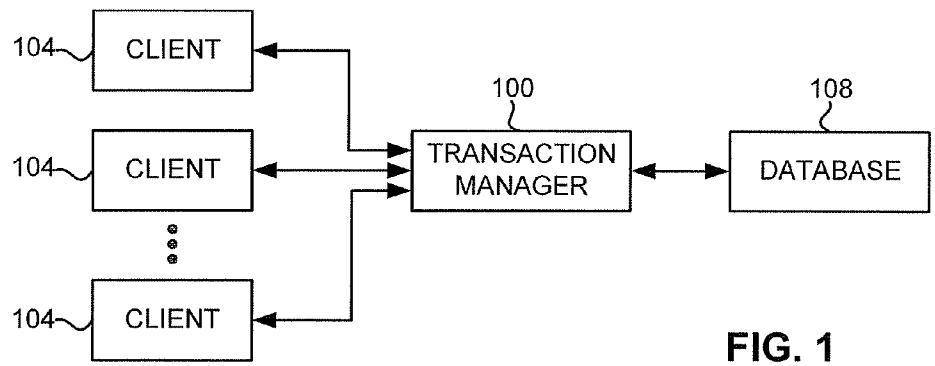
FIG. 1 is a block diagram of a preferred embodiment of the electronic trading system of the present invention.

FIG. 1 illustrates the electronic trading system in accordance with the present invention. Client terminals 104 are coupled to a transaction manager 100. The client terminals 104 are personal computers, terminals as part of a network, or any other computing device. Traders use the client terminals 104 to interact with trading pits that are managed by the transaction manager 100. The transaction manager 100 manages transaction requests generated by the client terminals 104, routes information to, from, and between the terminals 104 and the transaction manager 100, and stores and retrieves information from a database 108 or databases 108.

Figure 2:
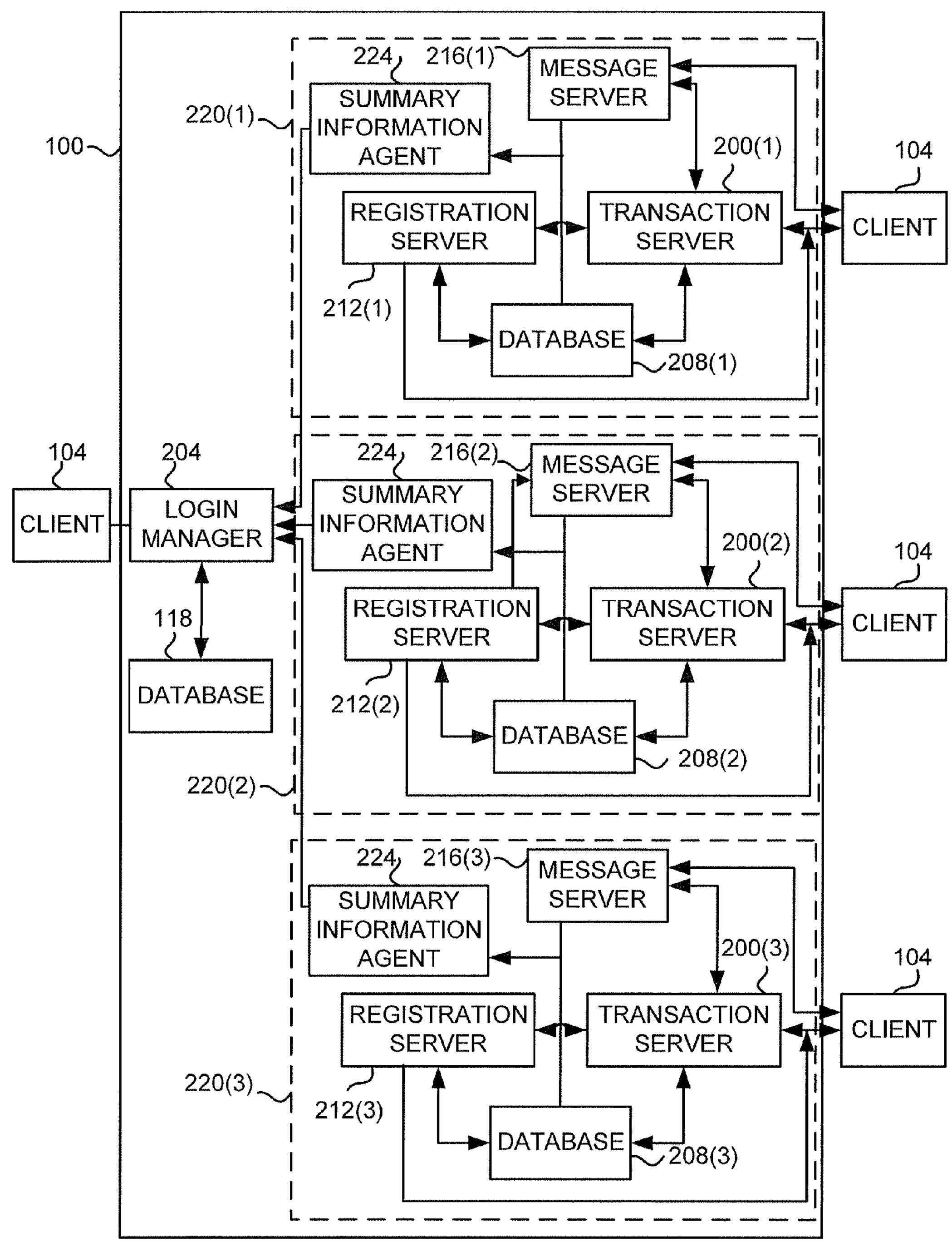
FIG. 2 is a block diagram of a preferred embodiment of the transaction manager of the present invention.

FIG. 2 illustrates a more specific embodiment of the transaction manager 100. The clients 104 are coupled to log-in manager 204 to provide to each client access to the transaction manager 100, and to allow each client 104 to designate one or more trading pits 220 to which to be connected. The transaction manager 100 hosts one or more transaction processors 200. Each transaction processor 200 is responsible for the trading of a specified item, essentially supporting a specific trading pit. The summary information agents 224 for each transaction processor 220 provide a current status of the activity of each pit 220 to a trader connected to the log-in manager 204. The trader can select a pit 220 to which to be connected based upon the summary information. Once the log-in process is complete, the clients 104 are coupled to a registration server 212 for the specified trading pit 220. Registration for each pit 220 requires the client 104 to provide an access key that it received from the login manager 204 during log in.

After registering for a pit 220, the trader is able to add, modify or delete orders for the item being traded in the trading pit 220. One type of an order called a "bid" is an order to buy up to a specific quantity of an item at or below a specific value. Another type of an order called an "offer" is an order to sell up to a specific quantity of an item at or above a specific value.

Other types of orders are possible depending on the type of item being traded in the trading pit 220.

Each pit 220 includes a transaction server 200. The transaction server 200 receives orders, matches bids and offers (when a bid and offer are matched it is called a trade or execution) and routes information to both the database 208 and the client terminals 104 connected to the trading pit 220. The client terminals 104 generate icons for bid and offer orders (called bid and offer icons), historical charts and trader icons, and determine the placement of bid and offer icons and trader icons responsive to the information received from the transaction server 200. The database 208 to which the transaction server 220 is coupled stores the information corresponding to each trader, is information on every order submitted over a period (such as start of trading days), information on every trade over a period (such as last 180 days) and the information corresponding to the item being traded. Each trader may have information associated with the trader's account stored, including a name, e-mail account, address, phone number, personal value quantifying metric or analytic activity level history, and various other information which is unique to the individual trader and which may be used by the present invention to create a virtual trading environment.

The information corresponding to every order includes whether the order was a new order, modifications to an existing order or deletion of a previously submitted order, the type of order (for example, bid or offer), the value, the quantity, the time and date the order was submitted, and any other information specific to the order. The information corresponding to every trade includes the value, quantity, buyer and seller. The information corresponding to the item being traded includes the highest outstanding bid value and the lowest outstanding offer value for the item, as well as a list of the values of all open orders for the item. The item information is stored on the database 208 in a data structure such as an order table. The server 200 updates the information in the order table responsive to receiving information from the client terminals 104. The updated information is then transmitted back to the client terminals 104. Other information, such as information used in creating historical charts, may also be stored on database 208. Information which may be global to more than one pit 220, for example, trader personal information, is also stored on the system database 108, to allow the information to be accessed by each trading pit 220.

For traders registered to the same trading pit 220, all of their orders (i.e. bids or offers specifying a value and quantity) are transmitted to the transaction server 200 for that pit 220. The server 200 analyzes the orders for matches with outstanding, or open, orders. If there is a match between orders of different types, for example, between a bid and an offer, then a transaction is enacted and the client terminals 104 are notified to remove the matched icons. All outstanding orders are transmitted to each client terminal, allowing a trader to view all of the outstanding orders from all traders for an item on a trading pit at any given time. The client displays are updated continuously or at specific intervals to provide updated information regarding which orders are outstanding and the state of the market in the pit 220. As shown in FIG. 2, multiple trading pits 220 are provided in the electronic trading system, and a single trader may be connected to as many pits 220 at the same time as desired. The number of trading pits 220 which may be maintained in accordance with the present invention is scalable responsive to the number of servers which are provided in the system. The items of trade include any possible commodity, for example, minerals, futures, or shares in a corporation. Other network configurations can be used to implement the electronic trading system as is known to those of ordinary skill in the art.

Figure 3A:
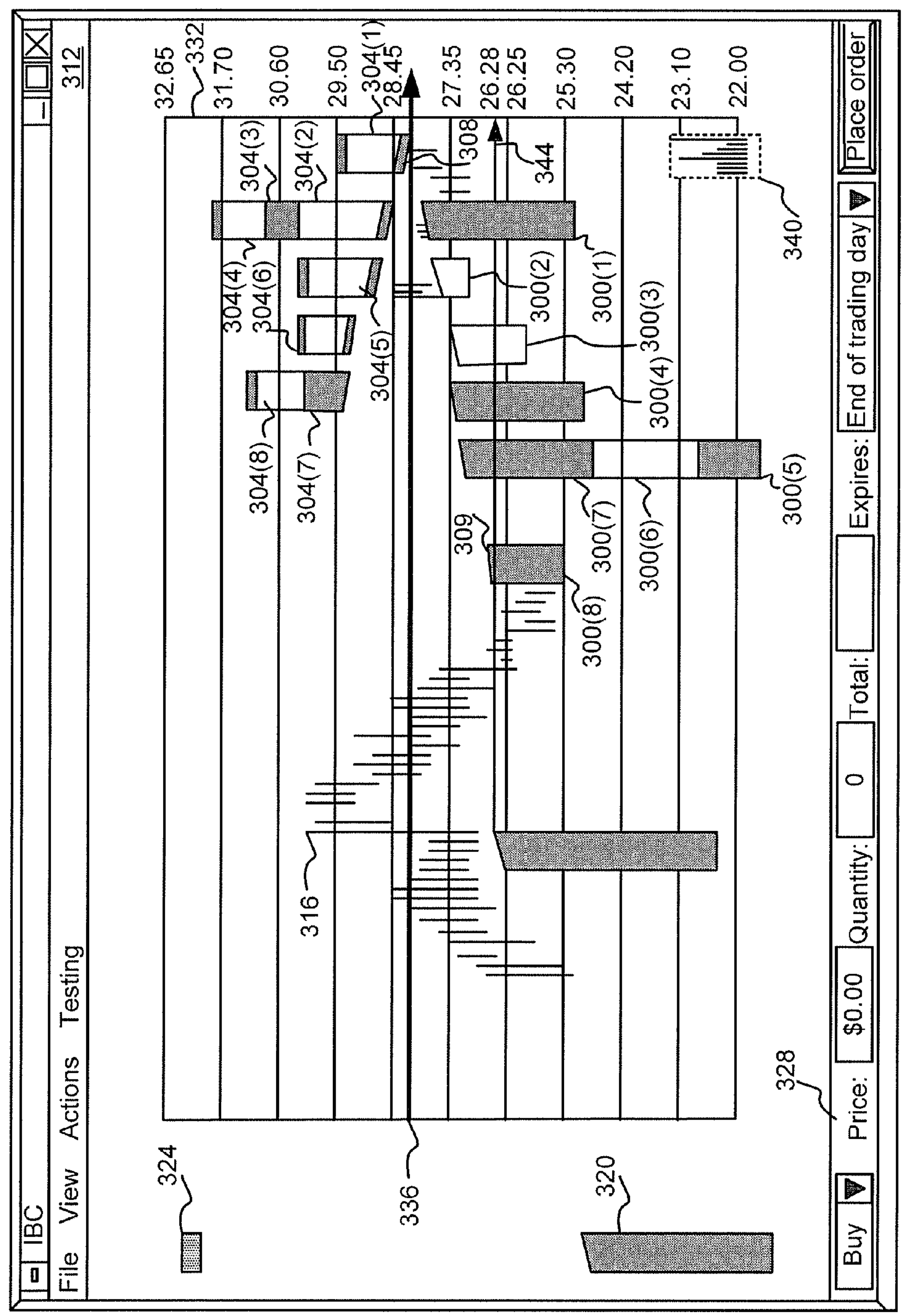
FIGS. 3*a*-3*c* are screen shots illustrating an embodiment of a Priority View in accordance with the present invention.

The client terminals 104 provide the interactive link between the traders and the trading pits 220, and display the various user interfaces of the present invention. FIG. 3*a* illustrates a priority view 312 which is designed to allow traders to intuitively place orders 300, 304 and view markers 336 representing value quantifying metrics, and contextual trend data 316 in accordance with the present invention. In the priority view embodiment, orders 300, 304 are displayed at a location corresponding to their value with respect to the value axis 332. Values may represent price, interest rate, or any other metric by which an item may be valued. For example, offer 304(1) has a value of $28.45, and the lowest point of the bottom edge 308 of the icon 304(1) is aligned with the value 28.45 on the value axis 332. In this embodiment, the top edges 309 of the bids and bottom edges 308 of the offer icons are angled. The rightmost bid is the bid having the highest value, and the rightmost offer is the offer having the lowest value. This allows the edges 308, 309 of the icons 300, 304 to form a triangle which points to the separation in value between the last lowest offer and the last highest bid. The quantity of each order is represented by a size of the icon such as its length or height. Icons having a larger size represent orders having a greater quantity. The specific quantity and other information of an order displayed on the screen may be known by selecting that order, which invokes a pop-up window to display the precise value and quantity of the selected order. In an alternate embodiment, the specific order information is displayed in the order task bar 328, in response to a trader selecting a bid or offer icon provided the order was submitted by the trader selecting the order. Alternatively, if space permits, the quantity and value may displayed in the icon itself.

If there are several orders with equal value, the orders are stacked or placed adjacent to each other responsive to the time at which the order was placed. For example, bids 300(5), 300(6), 300(7) have equal values at $29.50. Therefore, all three bid icons 300 are vertically stacked. A preferred method of stacking places the oldest orders closest to the horizontal space which naturally occurs and separates the bids and the offers. The horizontal separation between the bids and the offers occurs naturally because all of the bids displayed are always at a lower value then the displayed offers. If a bid is placed at a value equal to or exceeding an offer value, a transaction will be made immediately and the icons removed. For example, in the stack containing orders 300(7), 300(6), and 300(5) in FIG. 3*a*, the first and therefore the oldest bid in time was 300(7), and is placed at the top of the stack, closest to the horizontal separation between the displayed bids and offers. The other two stacked bids 300(6), 300(5) are positioned below the oldest bid 300(7), corresponding to the time at which they were submitted, and sorted in order of oldest to newest. In the stack containing offers 304(2), 304(3), and 304(4), the oldest offer 304(2) is positioned on the bottom of the stack closest to the horizontal separation, and the newest offer 304(4) is positioned on the top of the stack. The above method of ordering bids and offers is a preferred method, however other ordering schemes could be used within the scope of the present invention.

Figure 3B:
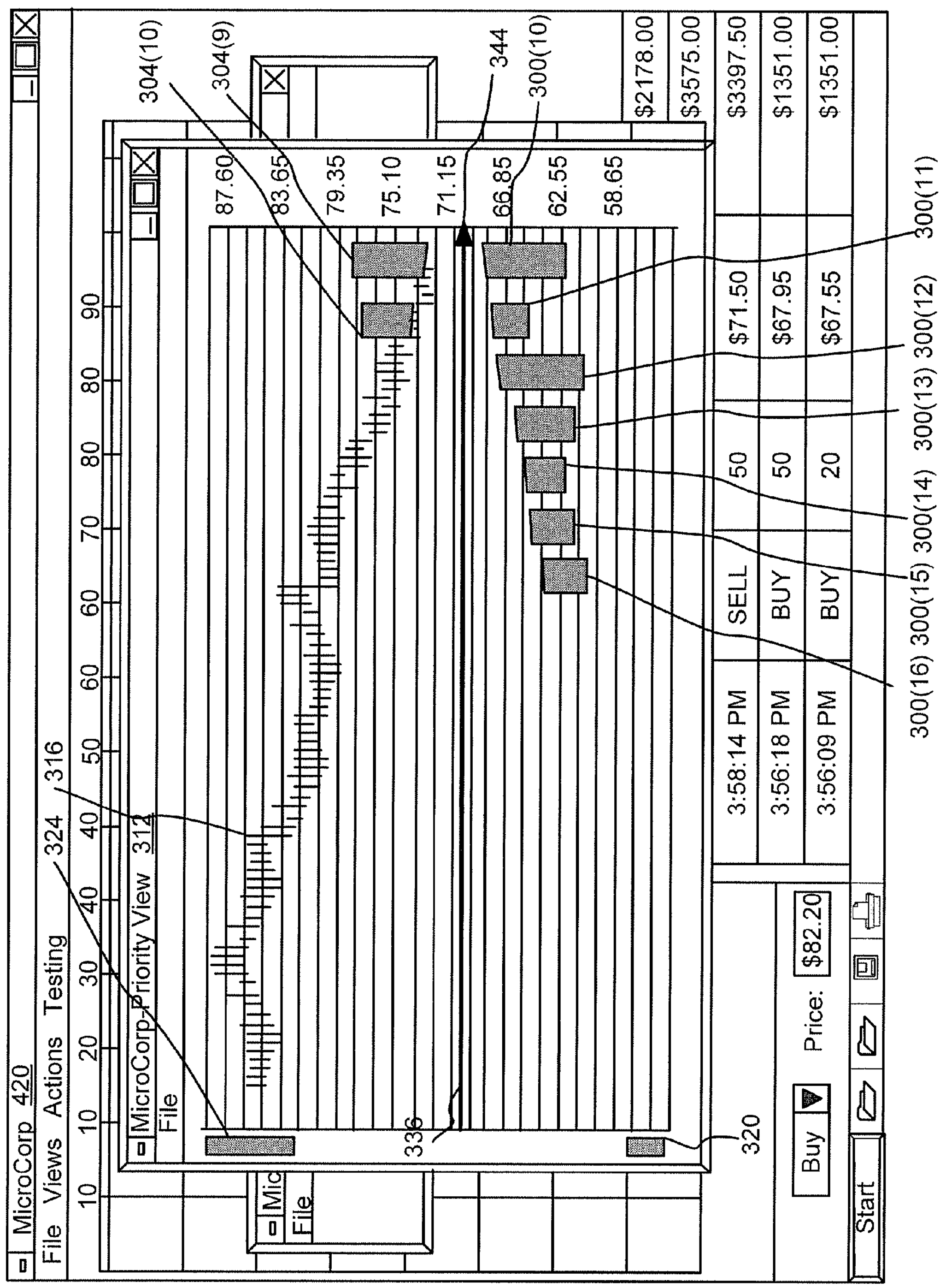

The trader using the client terminal 104 in accordance with the present invention, is shown all of the outstanding orders 300, 304 for the item being traded. This is one significant difference between the present invention and conventional systems because a trader using a system in accordance with the present invention is able to view trends in the bids and offers in addition to the buying and selling of the item being traded. For example, in FIG. 3*a*, a trader can quickly analyze the outstanding orders 300, 304, and determine that there are an almost equal number of bids 300 (8) as offers (9). Thus, the trader may infer that the market is stable, and the value for the item will not be dramatically driven up or down in the near future. Accordingly, the trader may decide to take no action. However, as shown in FIG. 3*b*, if demand builds through an increased number of bids being made, as shown by the display of an increased number of bid icons 300, or bids are being made for large quantities, as shown by the display of bid icons 300 having a greater size, and if supply recedes as indicated by the display of a reduced number of offers icons 304, the trader can anticipate that the value for the item will increase. Consequently, the trader will place bids for the currently low valued offers 304. Thus, by viewing all outstanding offer icons 304 and bid icons 300 as they are made on an item, the trader can anticipate the market and quickly adjust his or her trading plans to take advantage of the information. In contrast, in conventional systems, the trader only knows the last highest bid and the last highest offer. In the example of FIG. 3*a*, the trader would only know the existence of bid 300(9) and offer 304(1). Only the market maker would know of the existence of the other bids and offers. Individual traders would therefore be unaware of trends in bidding, and experience greater difficulty in anticipating the market.

The trader can also view the gap between offer icons 304 and bid icons 300 to determine at what value sales may be made and for what quantity. In the example of FIG. 3*a*, the trader can determine that there are several bids 300(5), 300 (6), 300(7), at a value slightly less than $27.35. Therefore, if the trader has a number of items to sell, the trader can make offers at that value and be assured of a sale of all of his or her items. However, if this value is too low, the trader can choose to keep all of his items until the value of the item has risen, which would be reflected in the display of additional bid icons at a higher value position in the screen. In contrast, if a trader was using a conventional system, the trader would have to offer his items incrementally, without knowing in advance when sales are likely to be made.

The value axis 332 indicates the value at which an item is being traded. This value may represent different qualitative measures for an item, such as the raw price for the item; for bonds, the value could be the cost for the bond or the implied interest rate for the bond, or the value be used as a measure for an implied volatility of the item, for example, a generic measurement of the relative expense of an option. Each trader can use their own value scale. For example, one trader may use a bond cost as an axis of values and another may use the implied interest rate of the bond. Regardless of a trader's choice of value, the different orders are displayed on the trader's screen in terms of the value the trader is chosen. Additionally, the value scales are completely customizable. For example, a gold arbitrageur could create a scale that measures the difference between the futures price of the metal less the spot cash price of the metal. The arbitrageur could then apply the cost of carry, including insurance and storage, to the future/cash price difference to generate an implied interest rate for the gold. Thus, the value axis for the arbitrageur would be an interest rate. In another example a trader who is interested in trading soybean oil could buy and sell soybeans, but, by using a value axis which accounts for the current cost of crushing soybeans, storage of soybeans, transport, etc, can be actually trading in soybean oil. Thus different traders in the same trading pit 220 would see the same bid and offers but organized with respect to their own specific value axis. Thus, the present invention provides enormous flexibility in constructing a view of an item's value which is directly representative of the trader's own interest in the item.

The priority view 312 offers several other advantages to a trader. The offers 304 and the bids 300 are displayed in different colors, shapes, textures or sizes, or other distinguishing visual characteristics, to allow the trader to quickly ascertain the current state of the market for this item. Additionally, orders made by the trader are displayed having a different visual characteristic than the visual characteristic used to display orders of other traders. This allows the trader to easily distinguish between their own orders and the orders of other traders. For example, in FIG. 3*a*, the trader is able to immediately determine that offers 304(3) and 304(7) are the trader's own offers 304, and therefore should be discounted from any market analysis. In FIG. 3*a*, the trader can also quickly determine that the trader himself is the trader with the most bids 300 in place, which suggests to the trader that the value for the item may be driven down if the trader removes his bids 300 from the pit 220.

Orders can be placed by a trader using the user interface of the present invention in variety of ways. In one embodiment, as shown in FIG. 3*a*, the trader can directly submit an order by using the order task bar 328. The options to specify value and quantity of either a bid or offer, and the expiration period are provided. After the information is entered, the trader selects Place Order, and the order is submitted to the transaction server 200 for the pit 220, and an offer or bid icon 304, 300 is generated and displayed at the desired location at the desired size. The order information is communicated to the transaction server 200 and from there to the other client terminals, so that the new bid/offer appears in the displays of all other traders in this same pit. In a preferred embodiment, the trader submits an order by simply selecting either an offer token 324 or bid token 320 using a pointing device. After being selected, the trader adjusts the size of the offer or bid token 324, 320 until the size of the token matches the desired quantity of the order. Preferably, a pop-up window or other screen indicator is displayed to show in numerical terms the quantity of the current size of the token, to ease the process of creating a properly sized order token. Next, the token is dragged to a location on the screen which corresponds to the desired value of the order. Again, a screen indicator displays the current value for the token at its current location as it is being dragged to allow precise placement of the token at the desired value.

Figure 3C:
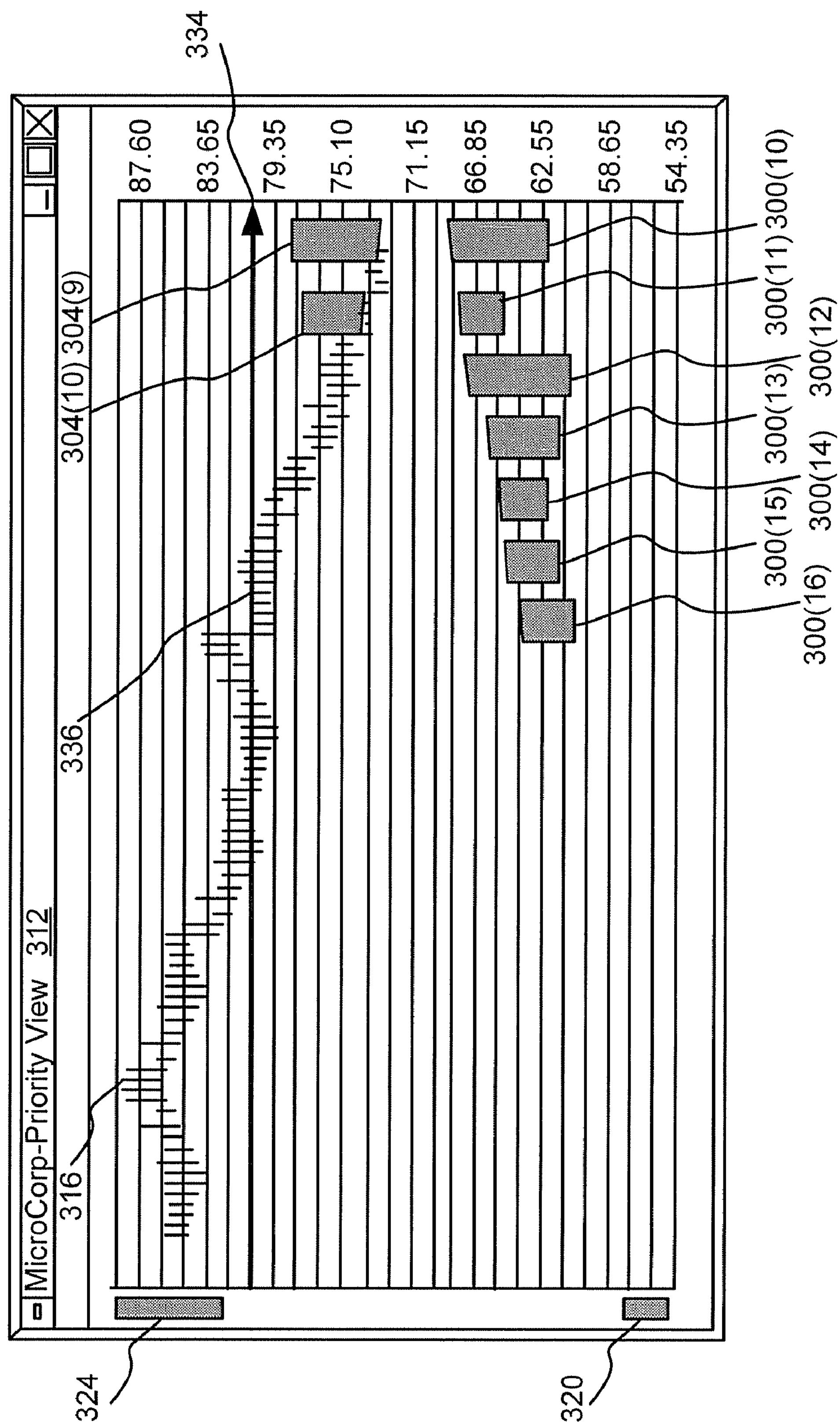
Figure 3A:
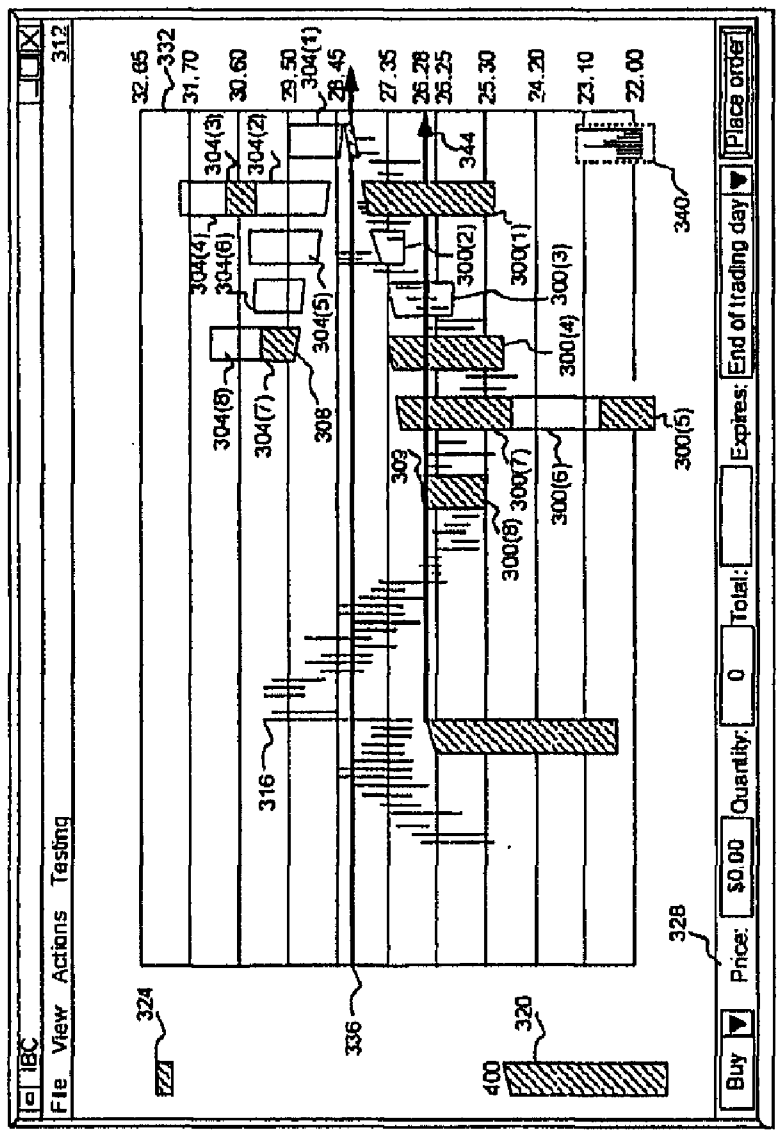
Figure 3B:
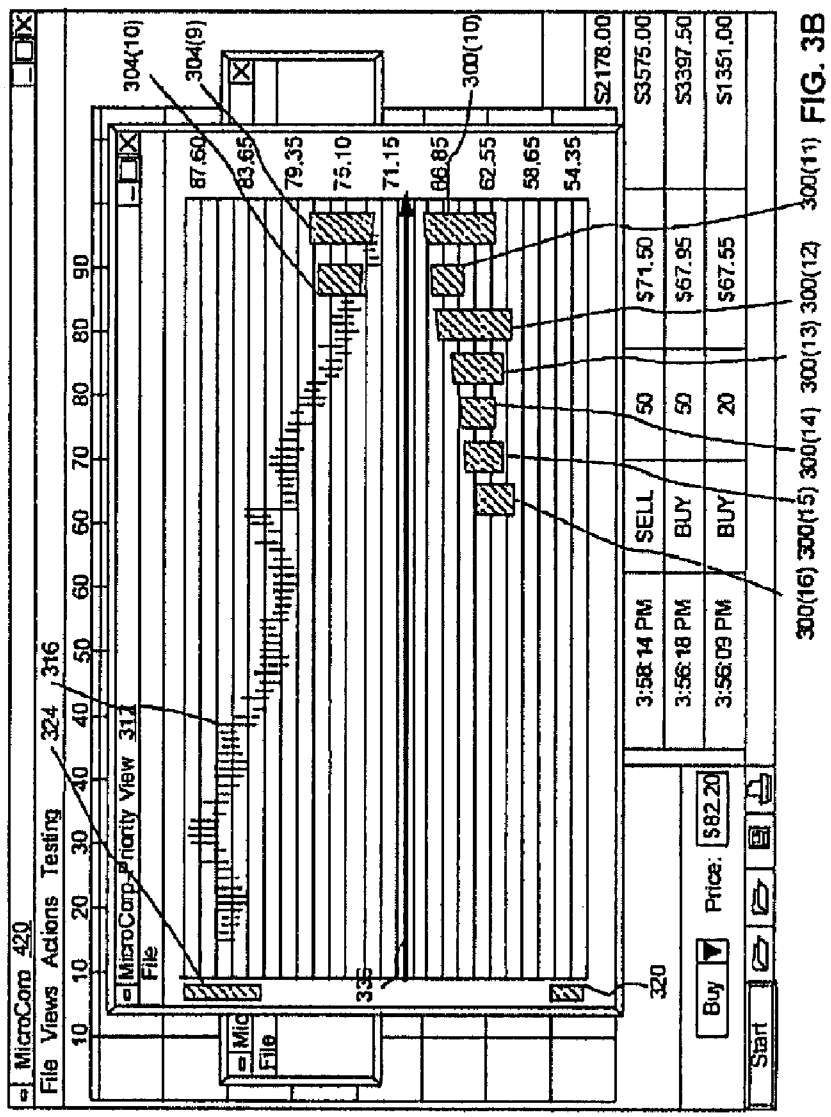
Figure 3D:
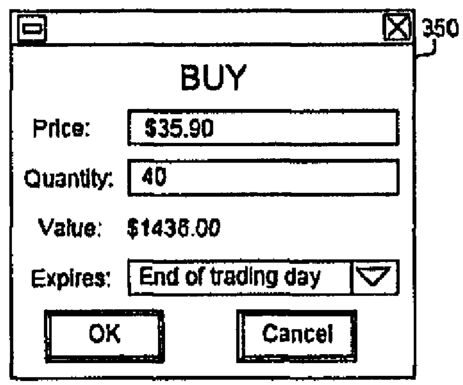
FIG. 3*d* illustrates a buy order pop-up window.
Figure 3E:
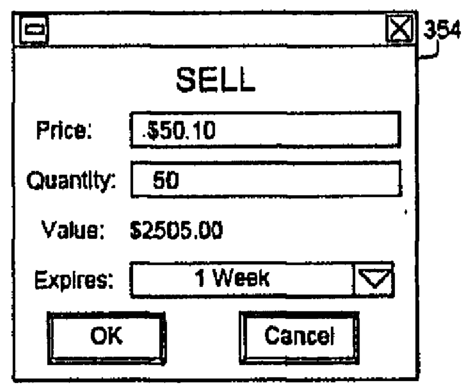
FIG. 3*e* illustrates a sell order pop-up window.

In the embodiment of FIG. 3*a*, a value marker 344 follows bid token 320 as it is moved to a location in the display. The value marker 344 indicates the value of the new order as the order is being placed. This allows for the trader to easily and precisely move the token 320, 324 to the desired value. After reaching the desired value, the trader releases the pointing device button and a Buy pop-up window 350, as shown in FIG. 3*d*, is displayed with the bid order information. The Buy pop-up window 350 allows the trader to modify the order information (value, quantity, expiration), cancel the order or submit the order with the presently displayed information. If the order is to sell an item, a Sell pop-up window 354 is displayed, as shown in FIG. 3*e*. After the order is submitted to the transaction server, it will be displayed on the screens of all traders in this trading pit connected to the transaction server 200.

An additional feature of the user interface of the present invention is the provision of contextual data. Contextual data comprises historical trading data of the item, historical or current trading data of other items, historical or current trading data of an average of items. For example, the trader may wish to have the Dow Jones Average™ displayed on the screen, and updated in realtime. Viewing contextual data along with the outstanding offers and bids allows the trader to better anticipate the market. For example, if the Dow Jones™ average is used as the contextual data, and is falling sharply, the trader may decide to begin selling his items even though the value of the item in the pit 220 has been stable. This allows the trader to anticipate where the market is headed. Any type of data useful to the trader can be displayed as contextual data. The contextual data 316 is preferably displayed as a historical chart 316 along a vertical axis of values and against a horizontal axis of time. The historical chart 316 can be displayed against any time period, for example, hours, minutes, etc. The historical chart 316 is updated periodically as the data for the item is updated. If the historical chart 316 includes the current item, as shown in FIG. 3*a*, bar lines are displayed in the data to indicate the high and low values of the item for that time period. A volume graph 340 is displayed at the bottom edge of graph. The volume graph illustrates the volume of transactions in the pit 220, and gives additional information to the trader regarding the state of the market for the item.

Yet another feature of the user interface of the present invention is the display of a marker 336. The marker 336 is representative of a value quantifying metric specified by the trader. The metric determines a current action value for the item which identifies the value at which the trader should act if the value of the item rises above the action value or falls beneath the action value. For example, in FIG. 3*b*, the value quantifying metric generates an action value of $68.57. The marker 336 is displayed at this value to indicate to the trader the location of the action value in relation to the current bids 300 and offers 304. In the example of FIG. 3*b*, the marker is displayed as an action line 336. As can be seen, the outstanding bids are below the action line 336 and the current offers are above the action line 336. This indicates to the trader that no action should be taken.

The value quantifying metric can be an algorithm or formula based upon factors the trader believes are important in ascertaining the true worth of an item. This metric can be set to reflect value-to-earnings ratio, volatility, volume of orders, percent gain, or any simple or complex design. The trader can input a custom metric or can select a metric from a predesignated list of metrics. Metrics may also be purchased from 3rd parties and incorporated into the client terminal 104. This allows new metrics to be added at any time. The action value displayed by metrics are dynamically determined either by the client terminal 104 or the server 200, and updated whenever new data is received regarding a component of the metric. Thus, the trader is given the latest information to update the trader's action line 336, allowing the trader to make current, informed decisions regarding possible orders. For example, in FIG. 3*c*, the metric has been updated from the time of FIG. 3*b*. The action line 336 has moved corresponding to the new action value of $80.21. As can be seen displaying the updated action line 336 allows the trader to immediately determine that the outstanding offers are now below his action line 336, and therefore that these offers should be purchased despite the fact that the offers themselves remained at the same value from the time of FIG. 3*b* to the time of FIG. 3*c*.

As discussed above, a trader may be connected to several trading pits 220 at once. If a trader has multiple connections, the trader can view the different pits 220 simultaneously, or if the trader wishes to concentrate on a single item, the trader can have only one pit 220 displayed. Additionally, the trader can disable the different options for a view to suit the trader's preferences, and maximize visibility for a trader's particular terminal 104.

Figure 4:
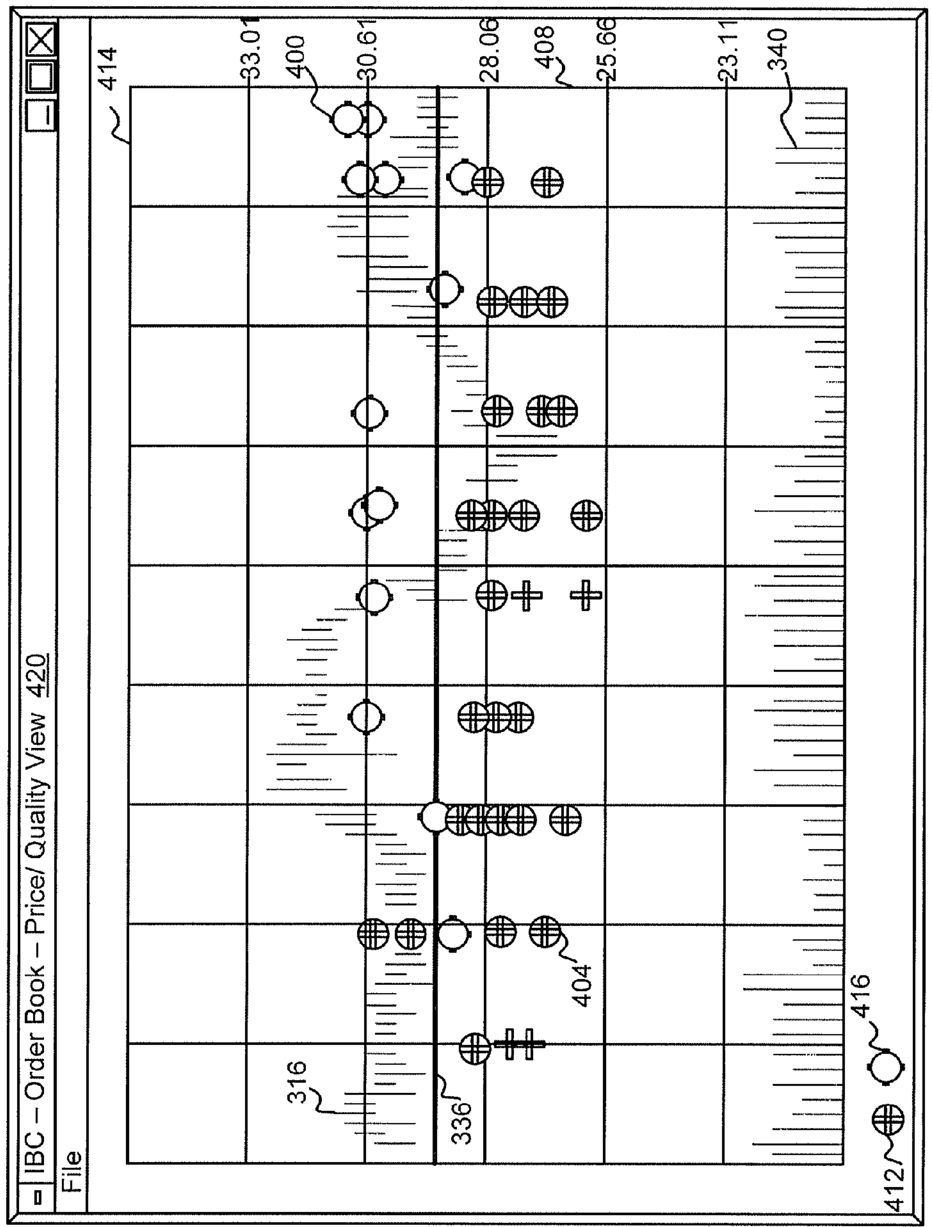
FIG. 4 is a screen shot illustrating an embodiment of a Value/Quantity View in accordance with the present invention.

FIG. 4 illustrates an alternate view of the user interface in accordance with the present invention. The value/quantity view 420 illustrates the market for the item using a first axis of values 408 and a second axis 412 for quantity. Thus, the location of each offer icon 400 and each bid icon 404 represents the value for the offer or bid and the quantity for which the offer or bid is made. Optionally, the action line 336 is also displayed, as well as the contextual data. The alternate view provides a different intuitive perspective on the state of the market. By providing alternate views, as shown in FIG. 3*c*, the electronic trading system of the present invention allows the different preferences of different traders to be met. Orders in this view are placed by selecting an offer token 416 or a bid token 412 and moving the token to a location which corresponds to the desired quantity and value. If the trader wishes to purchase immediately, the trader can simply drag a bid token 412 to the location directly over any offer token, and a window pops up displaying a bid order with value and quantity equal to that of the offer token. If the trader wishes to sell immediately, the trader can simply drag an offer token 416 to the location directly over any bid token, and a window pops up displaying an offer order with value and quantity equal to that of the bid token. The trader can then execute the transaction.

Figure 5:
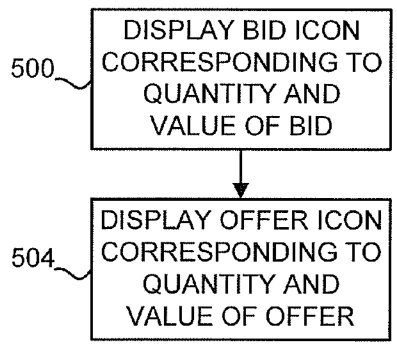
FIG. 5 is a flow chart illustrating a preferred embodiment of a method of displaying bid and offer icons in accordance with the present invention.

FIG. 5 is a flow chart illustrating a preferred embodiment of the user interface in accordance with the present invention. The client terminal 104, through data received from the transaction server 200, displays 500 at least one outstanding bid icon corresponding to a quantity and value of the bid. The client terminal 104 also displays 504 at least one outstanding offer icon corresponding to a quantity and value of an offer. Thus, by displaying at least one outstanding bid and offer icon, the "book" is opened and traders viewing the client terminal can readily spot trends in supply and demand for an item and quickly anticipate the market.

Figure 6:
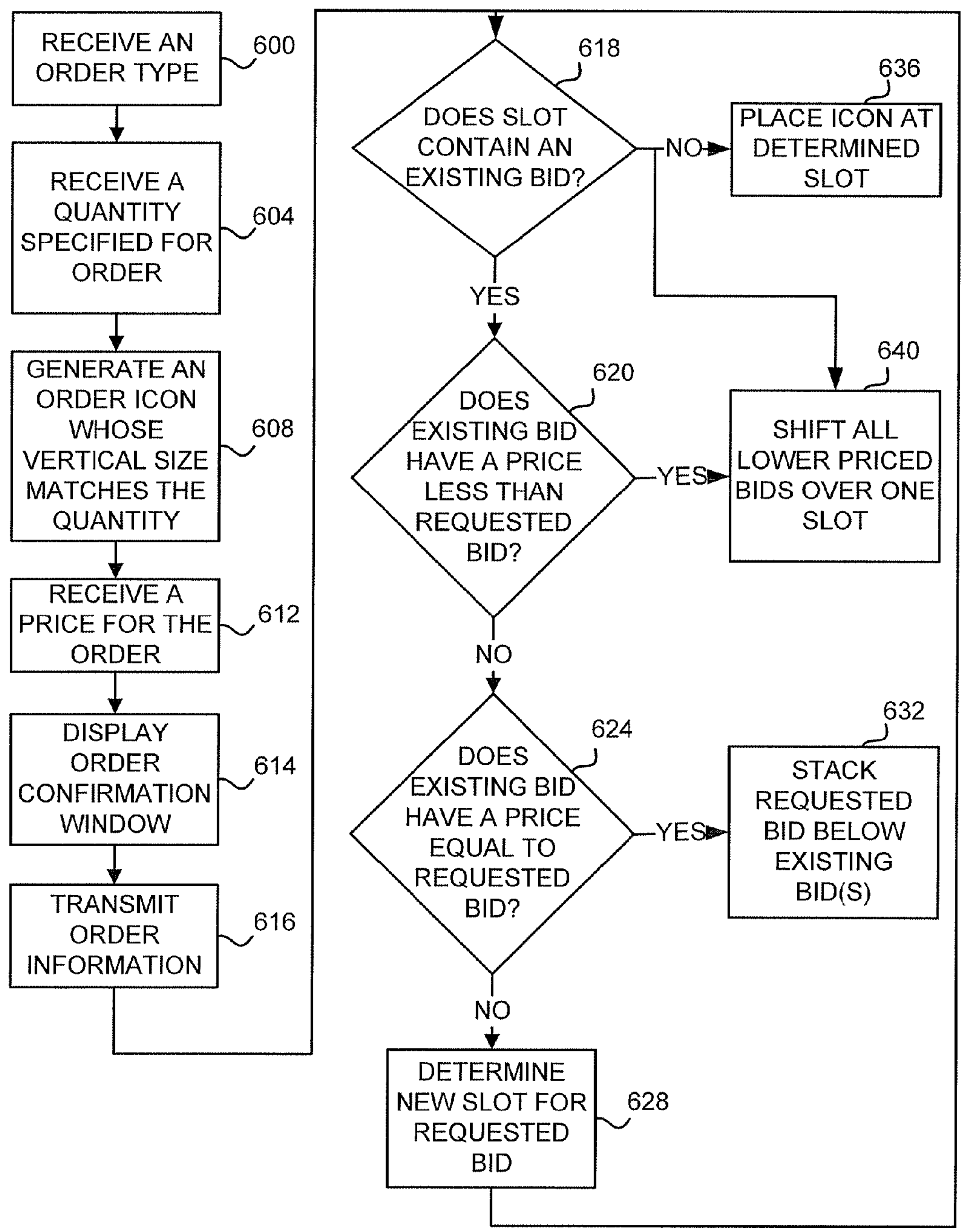
FIG. 6 is a flow chart illustrating a preferred embodiment of a method of generating a bid order icon in accordance with the present invention.

FIG. 6 illustrates an embodiment of a method of generating an order icon in accordance with the priority view 312 of the present invention. First, the client terminal 104 receives 600 the order type. The order can be either a bid or an offer. The trader specifies the type by selecting an offer or bid token to place the order, or by manually indicating the order type on the task bar. Second, the client terminal 104 receives 604 a quantity specified for the order. The quantity, as described above, is specified by the trader either by entering the number directly into the order task bar or by adjusting the size of the order token. In an embodiment where the order information is entered into the taskbar, an order icon will be generated 608 whose vertical size matches the quantity specified after the order has been processed by the server 200. The client terminal 104 then receives 612 a value for the order. Again the trader can specify the value by entering the information into the taskbar or can drag the order token to the location corresponding to the value. Finally, the client terminal 104 displays 614 an order confirmation window displaying the value, quantity, and expiration information. The trader can modify the order in this window and then must either cancel the order by closing the window or pressing the cancel button or submit it by pressing the OK button. The client terminal 104 which receives the value and quantity and order type information transmits 616 the information to the server 200. The server 200 then processes the order information, and updates the order table.

Once the server 200 transmits updated order information to a client terminal 104, the client terminal 104, in the priority view, determines 618 whether a slot is open adjacent an existing order which has a lower value, if the order is a bid, or a higher value, if the order is an offer. In the priority view 312, the horizontal axis is divided into slots, each slot having a width equal to an order icon 300, 304 and each slot separated by a standard set-off unit. Incoming orders are sorted by the value of the order. For offers, the offers with the lowest values are positioned closest to the axis of values 332, and for bids, the bids with the highest values are positioned closest to the axis of values 332. When a new order is received, the client terminal 104 re-sorts the outstanding orders and places the order icons 300, 304 in the appropriate positions. If a new order is equal to an existing order of the same type, the order is stacked onto the existing order. FIG. 6 illustrates a more detailed methodology of the sorting mechanism, using the example of placing a new bid. However, the methodology is equally applicable to placing a new offer.

A new bid is designated for the slot adjacent an existing bid which has the least value of the set of existing bids having values greater than the value of the new bid. The client terminal 104 determines 618 whether this determined slot has an existing bid within it. If it does not, the icon is placed 636 at the determined slot. If the slot does contain an existing bid, the client terminal 104 determines 620 whether the existing bid has a value less than the requested bid. All existing bids that have values less than the requested bid are moved 640 to the adjacent slot positioned away from the axis of values 332. In the example of FIG. 3*a*, the adjacent slot would be a slot positioned to the left. All other bids having values less than the requested bid are shifted 640 correspondingly. If the client terminal determines 624 that the existing bid has a value equal to the existing bid, the requested bid is stacked 632 below the existing bid or bids, away from the horizontal separation between bids and offers as described above. If the client terminal 104 determines 628 that the existing bid is greater than the requested bid, a new slot is determined 628 for the requested bid, and the process is repeated.

Figure 7:
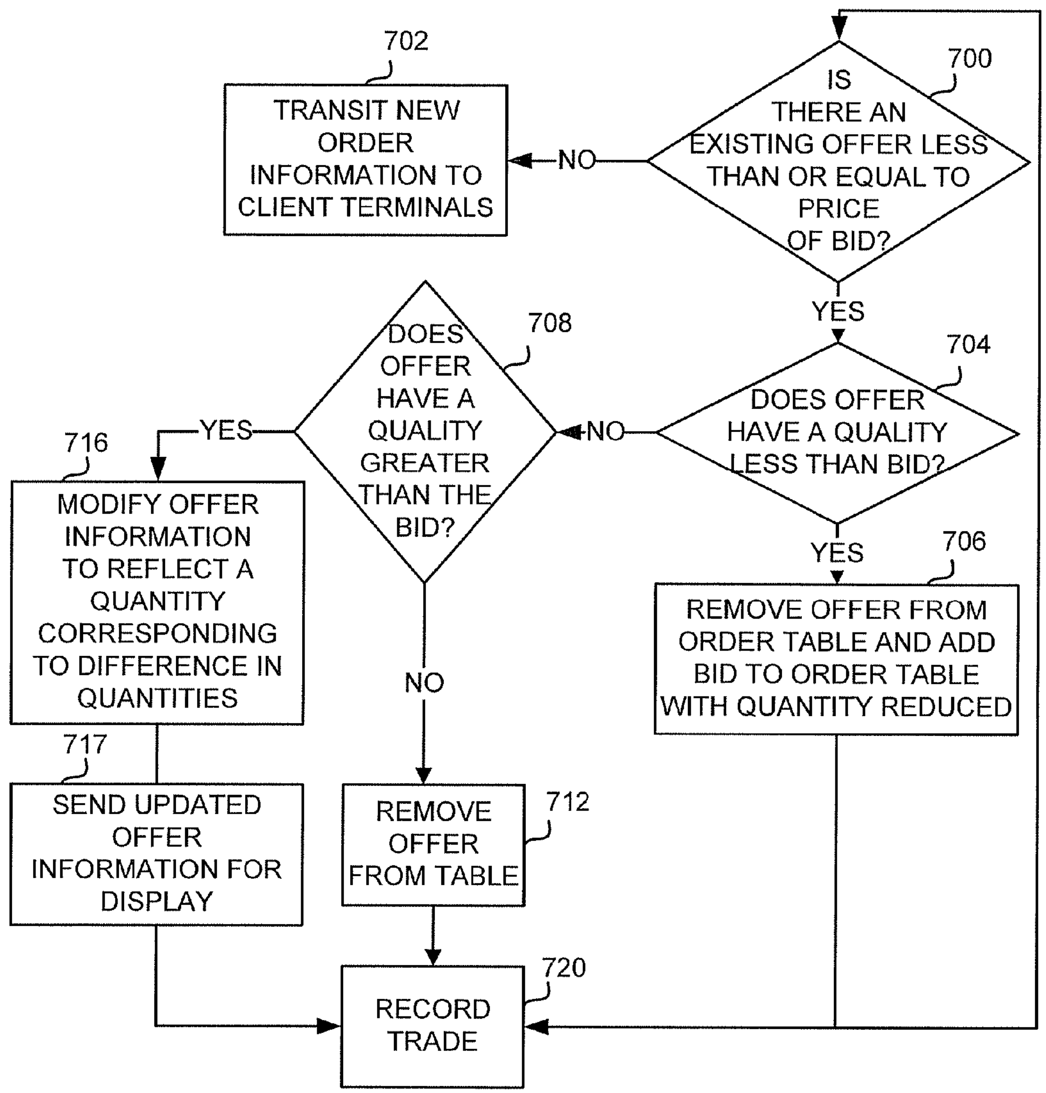
FIG. 7 is a flow chart illustrating a preferred embodiment of a method of generating a offer order icon in accordance with the present invention.

As shown in FIG. 7, upon receiving new bid information, the transaction server 200 determines 700 whether there is an existing offer in the order table having a value less than or equal to the requested bid. If there is not, the new bid is added to the table, and the information regarding the new bid is sent 702 to the client terminals 104 for display. If there is an existing offer whose value is less than or equal to the requested bid, i.e., if the new bid is the highest value bid outstanding, the server 200 determines 704 whether the existing offer has a quantity which is less than the quantity represented by the bid. If the offer does have a quantity less than the bid, the server removes 706 the offer from the order table and adds a new bid to the order table with the quantity reduced by the quantity of the offer removed.

The server 200 records 720 a trade between the trader submitting the new bid and the trader submitting the removed offer, at a value equal to the offer value and a quantity equal to the offer quantity. All of the outstanding client terminals 104 are sent the information regarding the trade. The client terminals 104 then remove the existing offer icon and add a bid icon which has a size corresponding to the difference in quantities between the existing offer icon and the requested bid icon. The transaction server 200 determines 700 again whether there is another existing offer in the order table having a value less than or equal to the requested bid to determine if another transaction can be made with the quantity remaining in the bid.

The server 200 also determines 708 whether the offer has a quantity greater than the quantity of the requested bid. If it does, the quantity of the offer is reduced 716 by the quantity of the bid, and the updated offer information is sent 717 to the client terminals 104 for display. A trade is recorded 720 between the trader submitting the new bid and the trader who submitted the offer at a value equal to the offer value and a quantity equal to the bid quantity. All of the outstanding client terminals 104 are sent the information regarding the trade and update the user interface displays accordingly.

If the quantities of the bid and offer are equal, the offer is removed 712 from the table and the transaction is complete. A trade is recorded 720 between the trader submitting the new bid and the trader who submitted the offer at a value equal to the offer value and a quantity equal to the bid quantity. All of the outstanding client terminals 104 are sent the information regarding the trade, and update the user interface displays accordingly.

Figure 8:
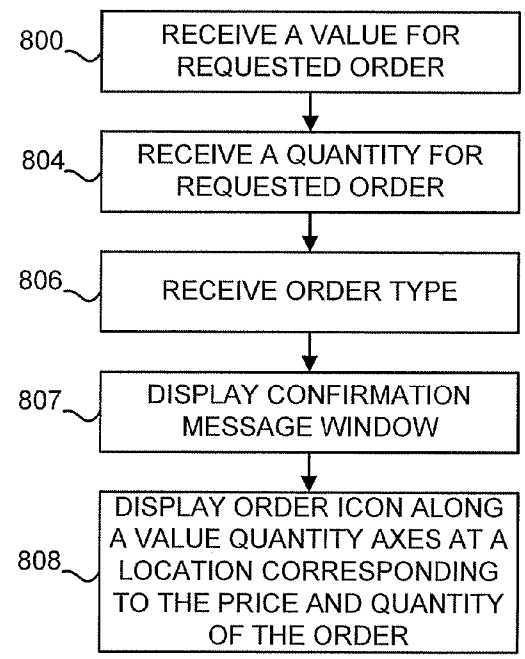
FIG. 8 is a flow chart illustrating an alternate embodiment of generating an order icon.

As shown in FIG. 8, in the value/quantity view, the client terminal 104 receives 800 a value, receives 804 a quantity, and receives 806 an order type for a new order. A confirmation window is displayed 807, and, upon confirmation of the order, the order information is transmitted to the server 200. Again, this may occur responsive to the trader entering in the information directly or dragging an order token to the proper location and after confirming the order. The server 200 receives the order information, updates the order table, and sends the updated information to the client terminals 104. The client terminals 104 display a new order icon at a location corresponding to the value and quantity of the order with respect to the axis of quantities and axis of values. If the new order is an offer, and there is an existing bid for a value higher than or equal to the value of the offer, a transaction is completed, and a new offer or a modified bid token is displayed responsive to the quantities that the original offer and bid icons represented.

Figure 9:
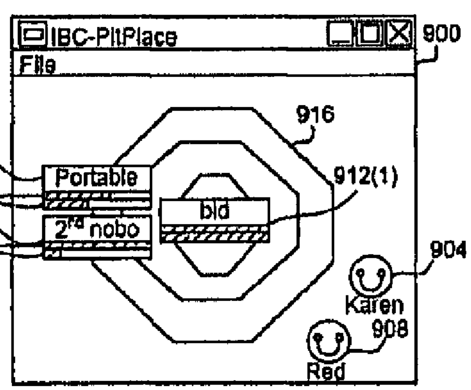
FIG. 9 is a screen shot illustrating a Pit Panel view in accordance with the present invention.
Figure 4:
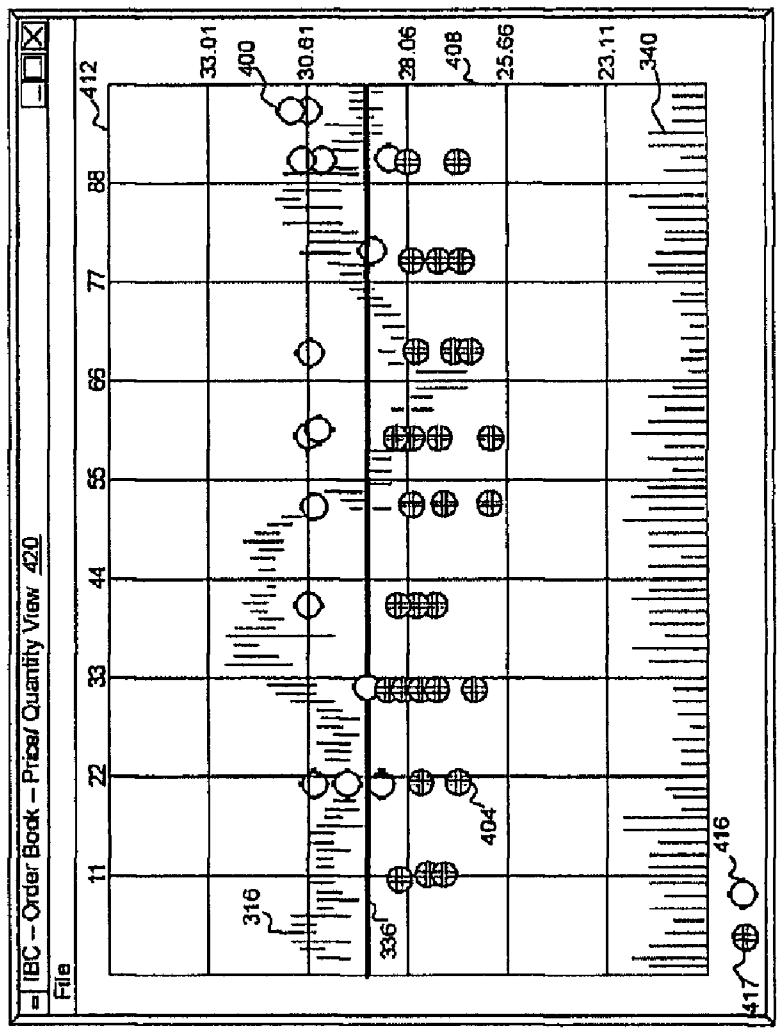
Figure 6:
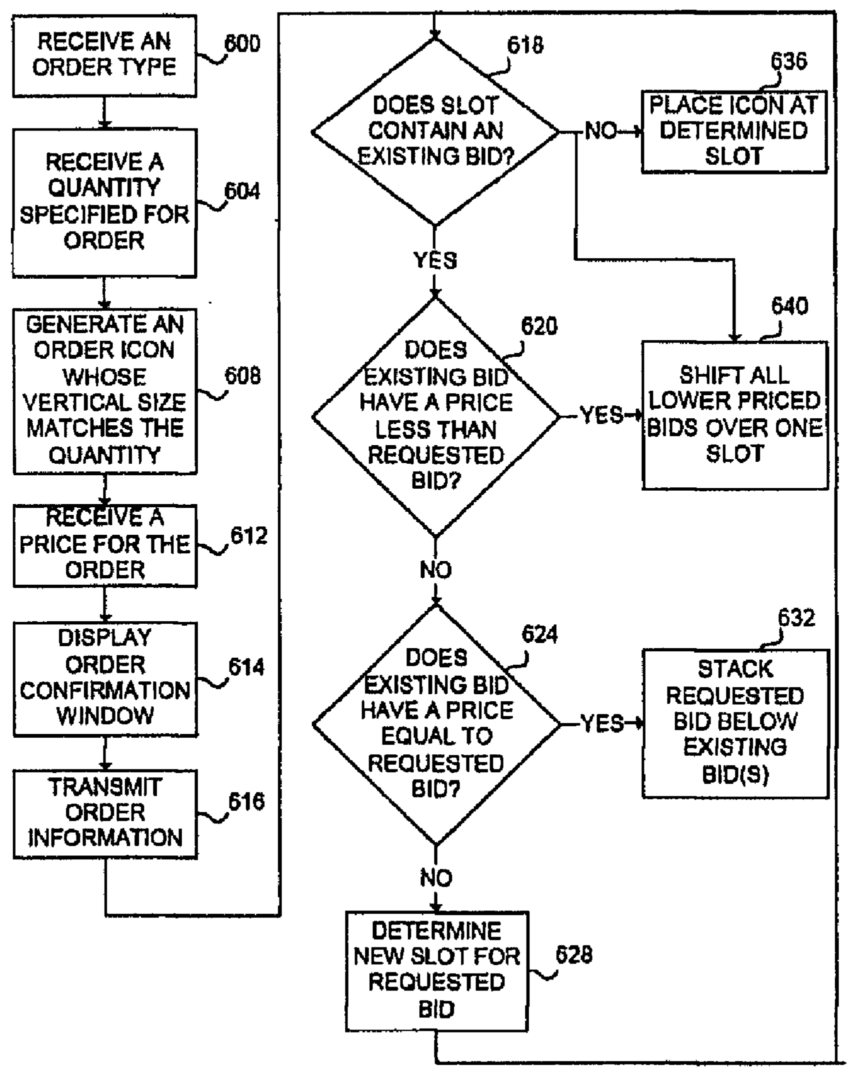
Figure 7:
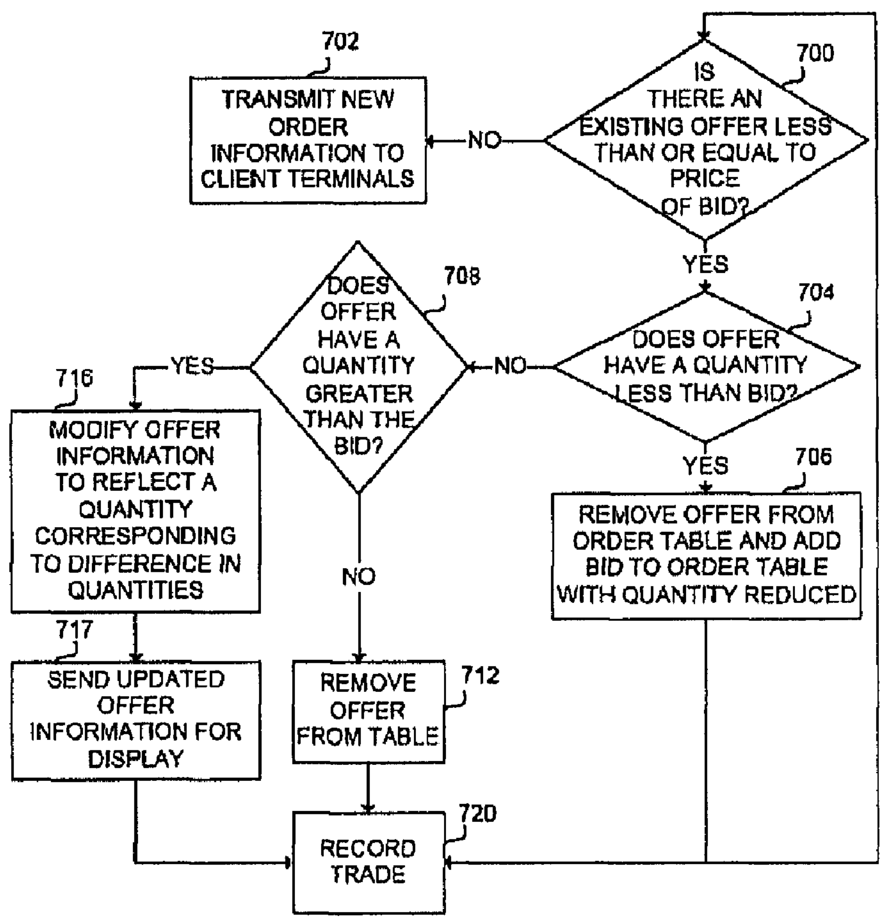
Figure 10:
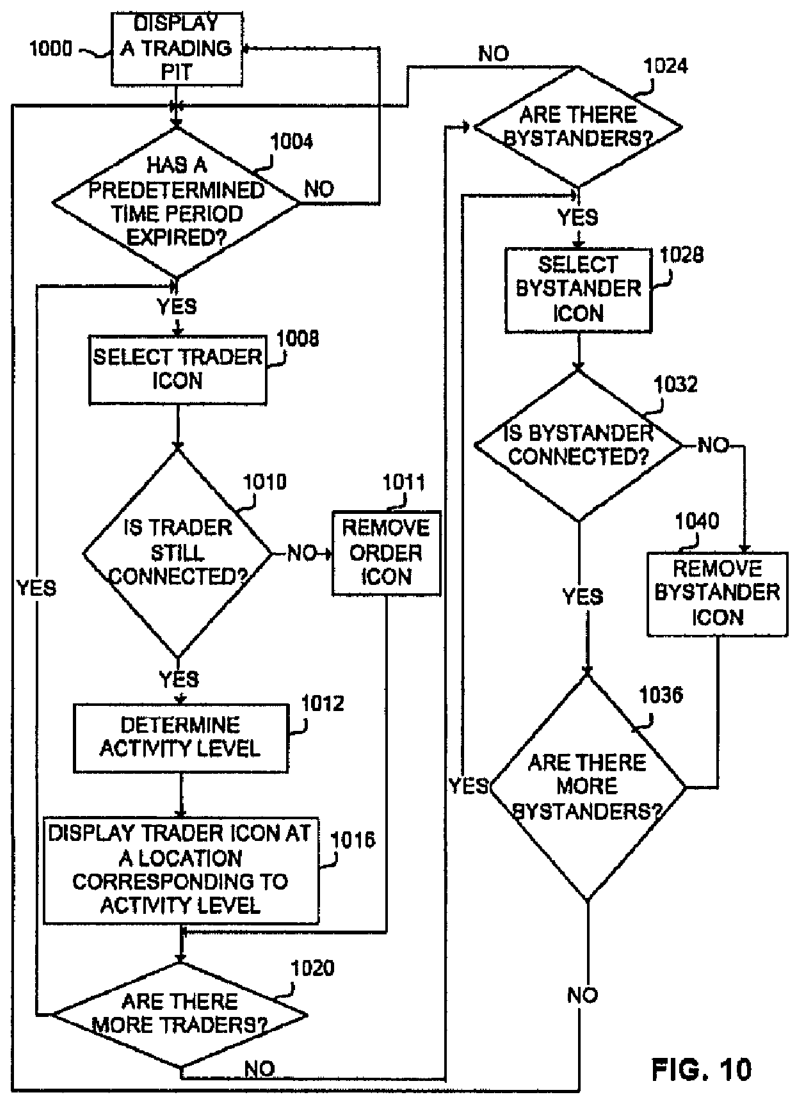

FIG. 9 illustrates a trading pit view 900 called the pit panel view 900, in accordance with the present invention. The pit panel view 900 provides a visual interface to other members of the pit 220. All users who are currently registered to the pit 220 are displayed in the pit panel 900. This is critical information to a trader regarding the activity of the pit 220. If the pit 220 is crowded, the trader can expect volatility in trading. If the pit 220 is empty, the trader can expect light trading and relatively stable values for the item.

The pit panel 900 displays trader icons 912, observer icons 904, and floor broker icons 908. Observers are users who are registered to the pit 220 but who are not actively trading and floor brokers are individuals who have expertise on a pit's item and traders, and who assist traders in executing unusual trades, negotiating a deal with multiple traders, or providing history and information on traders to others. As the observers do not trade for themselves, their icons 904 are placed on the outside of the pit icon 916. Floor brokers who do not trade also have their icons 908 placed on the outside of the pit icon 916.

The trader icons 912 are displayed on the pit icon 916. The pit icon 916 is preferably displayed as a series of concentric polygons, where each polygon represents an activity level or levels. Traders who are more active are placed closer to the center of the pit icon 916. The most active trader, in the example of FIG. 9, trader 912(1), is placed in the center of the pit icon 916. In a preferred embodiment, each polygon represents a range of activity levels. For example, the innermost polygon contains the traders with the second through ninth highest activity levels. The next polygon contains the traders having the tenth through twenty-sixth highest activity levels, and so forth. By grouping traders into activity ranges, and thus shifting a trader's icon out of a polygon only in response to the trader's activity level shifting out of the range represented by the polygon, icon changes and consequent flicker in the display of the pit icon 916 are minimized. However, a trader is able to easily ascertain who the active traders in a pit 220 are and how active the traders are by noting the relative locations of the trader icons 912 in the pit icon 916.

Each trader icon 912 has order indicators 913 to show the quantity of orders a trader has outstanding. Preferably, there are separate indicators 913 for bids and offers, each showing the volume of outstanding bids or offers the trader currently has placed. Other order indicators 913 may be optionally displayed, for example, indicating the sum of all quantities of orders or the volume of orders entered over a specified period of time. Selecting a trader's icon 912 will also highlight the trader's orders on the priority view, value/quantity view, and other views provided in the system that display orders and which can all be displayed concurrently. Double clicking on a trader icon 912 generates a communication window as shown in FIG. 111 which allows the trader to send an email message 1108, send an instant message 1104 as part of a text chat session, communicate by voice over the network connection 1112, or set up a later telephone call or other optional communication to the selected other trader. Thus, the pit panel 900 provides a sense of community in the pit 220 by visual representing useful information, and provides additional information to the trader which the trader can use in anticipating the market.

Figure 10:
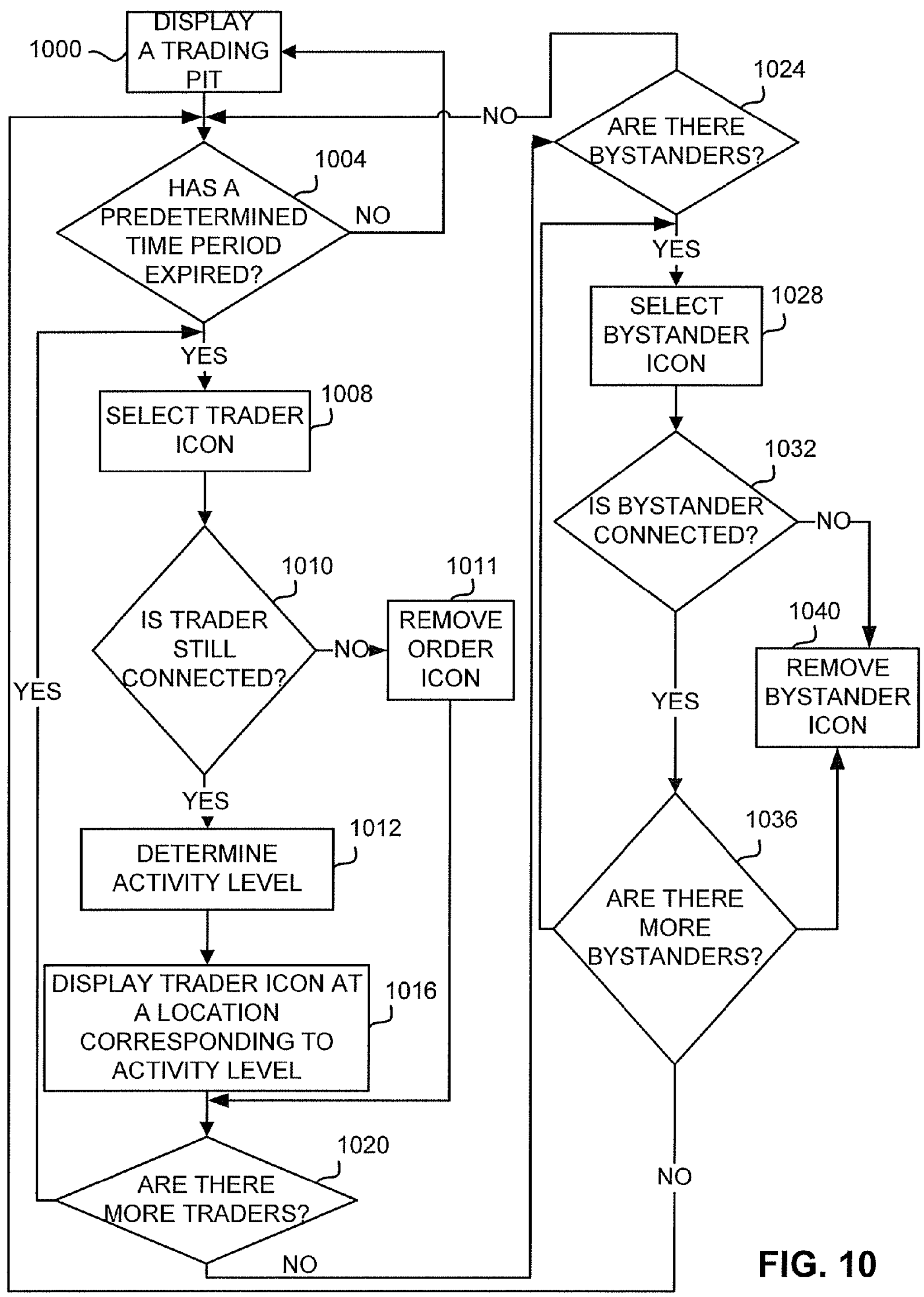
FIG. 10 is a flow chart illustrating a preferred embodiment of generating and placing a trader icon in accordance with the present invention.
Figure 11:
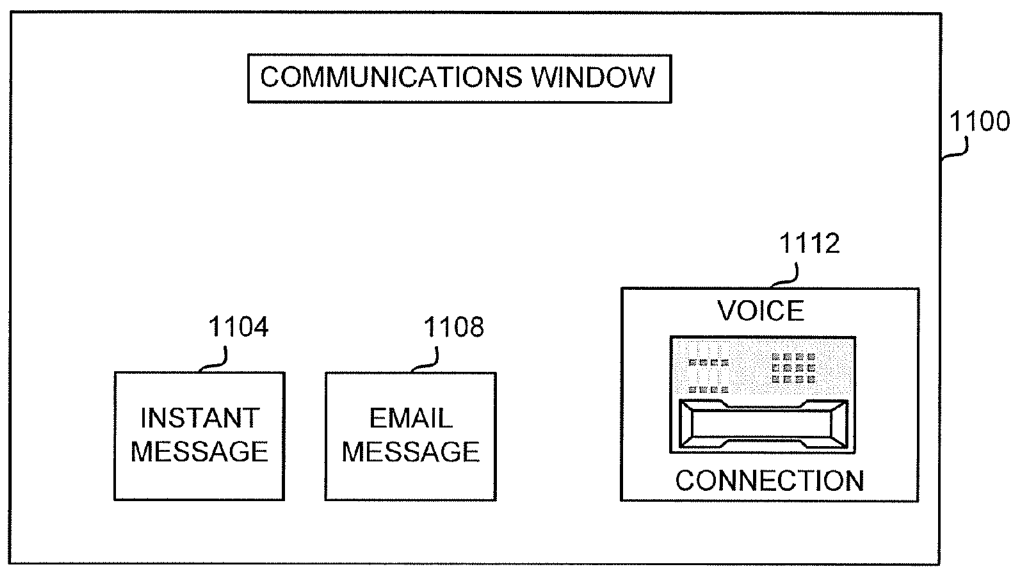
FIG. 11 is a screen shot illustrating a communication window in accordance with the present invention.
Figure 2:
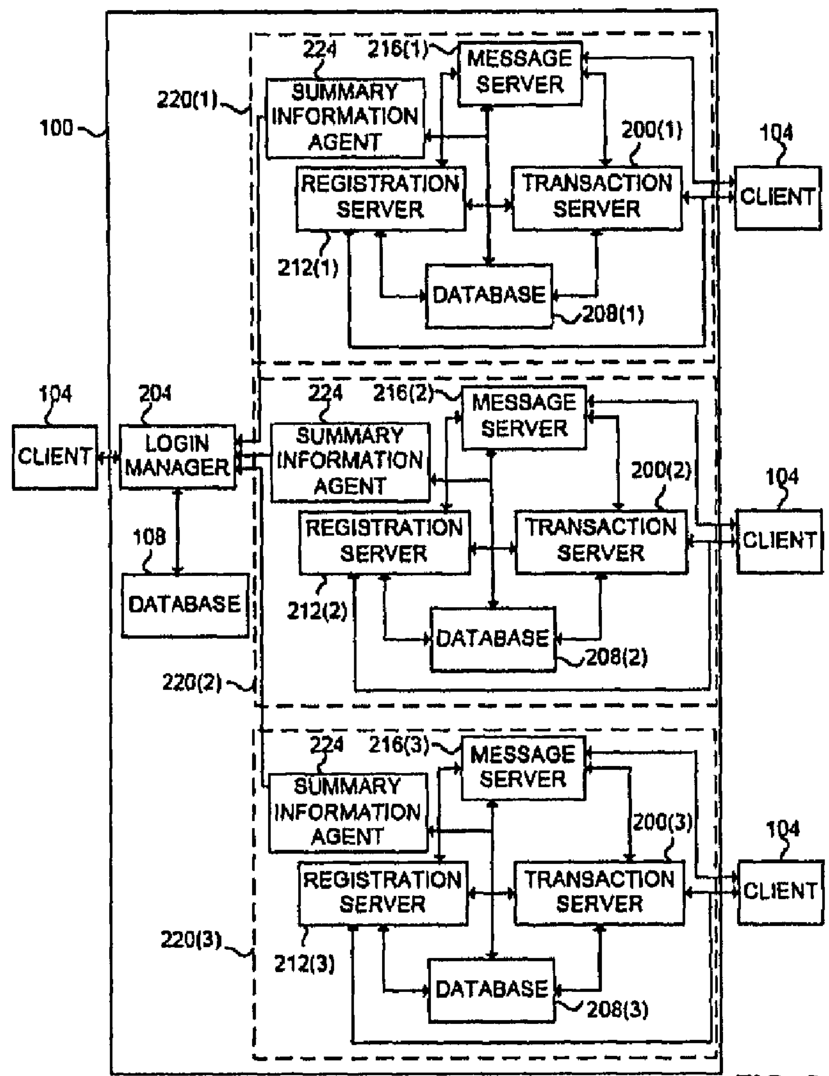

FIG. 10 is a flow chart illustrating a preferred embodiment of generating and placing a trader icon in accordance with the present invention. First, a trading pit icon 916 is displayed 1000. Next, the client 104 determines 1004 whether a predetermined period of time has passed. The pit panel data is updated periodically, and the client 104 waits for that amount of time before re-generating the display with the new data. If the server 200 determines 1004 that the predetermined period has expired, a first trader icon is selected 1008. The client 104 determines 1010 whether the trader is still connected to the server 200 from the data provided by the server 200. If the trader is not, the trader icon 912 for the trader is removed 1011, and the client 104 determines 1020 whether there are more traders. If the trader is still connected, an activity level is determined 1012 for the trader. Activity levels are determined as a combination of the volume of outstanding orders, the value of outstanding orders, recent activity, or other measures which determine how active a trader has been. Once the activity level has been determined, the client 104 displays 1016 the icon 912 for the trader at the location corresponding to the activity level. In an embodiment where order indicators 913 are displayed, the order indicators 913 are updated to include the latest order data. In the preferred embodiment, as discussed above, the pit icon 916 is comprised of concentric polygons or rings, the traders are ordered by activity levels, and each polygon represents a range of activity level orders. After the activity level of a trader is determined, the traders are reordered responsive to their activity levels, and the trader icon 912 for each the trader is placed in the polygon designated for the order of the trader. The client 104 determines 1020 if there are more traders. If there are not, the client 104 determines 1024 if there are bystanders and, if there are, selects 1028 the first bystander icon 904, 908 and determines 1032 whether the bystander is connected using data that is provided by the server 200. If the bystander is not connected, the bystander icon is removed 1040. If the bystander is connected, the client 104 determines 1036 whether there are more bystanders. If there are not, the client 104 returns to the step of determining 1004 whether a predetermined time period has ended, as the pit panel 900 view has been updated to reflect the current users and their current activity levels.

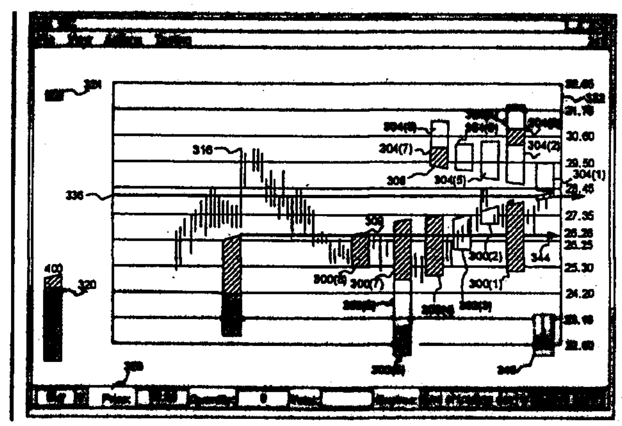

We claim:

1. A method of providing an interface to an electronic trading system in which a good is bought and sold responsive to orders placed by users of the electronic trading system, where orders comprise a bid type or an offer type, the method comprising:

generating a plurality of price levels that correspond to the good via a trading device having an electronic processor and communicatively coupled to the electronic trading system and displaying the plurality of price levels along a scaled price axis via an output associated with the trading device;

receiving bids for the good from an electronic exchange via the trading device and displaying the bids relative to the plurality of price levels along the scaled price axis via the output;

receiving asks for the good from the electronic exchange via the trading device and displaying the asks relative to the plurality of price levels along the scaled price axis via the output;

submitting an order for the good to the electronic exchange responsive to a user action received via a user input associated with the trading device, the user action specifying a quantity and a price for the order and displaying an order indicator corresponding to the placed order relative to the plurality of price levels along the scaled price axis via the output;

determining a specific price value based on a formula via the trading device; and generating and displaying a marker indicator relative to the plurality of price levels along the scaled price axis at a location corresponding to the specific price value that the marker indicator represents via the output, wherein the marker indicator ascends or descends the plurality of price levels along the scaled price axis responsive to changes in the specific price value.

2. The method of claim 1, wherein the specific price value is updated when new data is received regarding a variable of the formula.

3. method of claim 1, further comprising updating the specific price value and displaying the marker indicator at a new location relative to the plurality of price levels along the price axis, the new location corresponding to the updated specific price value.

4. The method of claim 1, further comprising updating the specific price value and if the updated specific price value is between a first price level and a second subsequent price level displayed along the scaled price axis, then the marker indicator is displayed at a new location representing the updated specific price value that is relative to locations representing the first price value and the second subsequent price value.

5. The method of claim 1, wherein a change in the specific price value is less than the difference between two subsequent price values displayed along the price value axis.

6. The method of claim 1, wherein the marker indicator comprises an action line that is oriented perpendicularly to the price value axis.

7. The method of claim 1, wherein the formula is input directly by a user.

8. The method of claim 1, wherein the formula is selected from a predesignated list of formulas.

9. The method of claim 1 wherein the good comprises a commodity.

10. A method for facilitating trading and displaying information to a user regarding the buying and selling of a good in a system where orders comprise a bid type or an offer type, the method comprising:

displaying a price axis representing the good via an output associated with a trading device;

determining a specific price value based on a formula via the trading device;

displaying an action line perpendicular to the price axis via the output, wherein the action line corresponds to the specific price value, and wherein the action line ascends or descends the price axis responsive to changes in the specific price value;

receiving a command to place an order icon for a quantity of the good at a location along the price axis via a user input associated with the trading device; and sending an order to an electronic trading system via the trading device, wherein the order is for the quantity of the good and at a particular price value determined based on the location where the order icon was placed.

11. A method for displaying information regarding the buying and selling of a good in an electronic trading system where orders comprises a bid type or an offer type and where such orders are matched based on a time priority, comprising:

displaying a value axis on a graphical user interface via an output associated with a trading device, wherein the value axis comprises values that represent prices for a good;

receiving market data indicating a first order and a second order are pending at a price at the electronic exchange via the trading device;

generating a first order indicator to represent the first order via the trading device;

generating a second order indicator to represent the second order via the trading device; and displaying the first order indicator and the second order indicator at locations in relation the price along the value axis via the output, wherein the arrangement of the first and second order indicators is based on a time each order was placed at the electronic exchange.

12. The method of claim 11, further comprising:

receiving market data indicating a third order is pending at the price at the electronic exchange;

generating a third order indicator to represent the third order;

displaying the third order indicator at a location in relation to the price along the value axis and adjacent to the first and second order indicators, wherein the arrangement of the third, second, and first order indicators is based on a time each order was placed at the electronic exchange.

13. The method of claim 11, wherein the first order was placed in time before the second and third orders, and further comprising: receiving a notification that the first order was matched, and removing the first order indicator from the display leaving the second and third order indicators for display.

14. The method of claim 13, wherein the second order was placed in time before the third order, and further comprising: automatically shifting the second order indicator to a location previously occupied by the first order indicator and automatically shifting the third order indicator to a location previously occupied by the second order indicator.

15. The method of claim 11, further comprising: displaying the first order indicator with a first visual characteristic to a user who requested the order first order, and displaying the second order indicator with a second visual characteristic to other users.

16. The method of claim 11, wherein the first and second orders are orders to buy the good, or the first and second orders are orders to sell the good.

17. The method of claim 11, further comprising adjusting the size of the first order indicator to correspond to the quantity associated with the first order.

18. The method of claim 11, further comprising adjusting the size of the second order indicator to correspond to the quantity associated with the second order.

19. The method of claim 11, wherein the value axis further indicates the value at which the good is currently being traded by displaying a highest bid indicator at a location corresponding to a current highest bid value and displaying a lowest offer indicator at a location corresponding to a lowest offer value along the value axis.

* * * * *

UNITED STATES PATENT AND TRADEMARK OFFICE

CERTIFICATE OF CORRECTION

PATENT NO. : 7,752,122 B2
APPLICATION NO. : 11/417546
DATED : July 6, 2010
INVENTOR(S) : Richard W. Friesen et al.

It is certified that error appears in the above-identified patent and that said Letters Patent is hereby corrected as shown below:

Replace Figures 2, 3A, 3B, 3D, 3E, 4, 6, 7, 9 and 10 as shown on the attached pages.

Column 2, lines 38-39: please delete "the item % vas" and insert --the item was--.

Column 6, line 34: please insert --be-- between "may" and "displayed."

Column 6, line 38: please delete "$29.50" and insert --slightly less than $27.35--.

Column 10, line 12: please delete "412" and insert --417--.

Column 10, line 15: please delete "412" and insert --417--.

Claim 3, column 14, line 40: please insert --The-- before "method."

Claim 11, column 15, line 19: please delete "comprises" and insert --comprise--.

Claim 11, column 15, line 33: please insert --to-- between "relation" and "the."

Signed and Sealed this

Sixteenth Day of November, 2010

David J. Kappos
*Director of the United States Patent and Trademark Office*

(12) United States Patent
Friesen et al.

(10) Patent No.: US 7,752,122 B2
(45) **Date of Patent: *Jul. 6, 2010**

(54) USER INTERFACE FOR AN ELECTRONIC TRADING SYSTEM

(75) Inventors: Richard W. Friesen, Fairfax, CA (US); Peter C. Hart, San Rafael, CA (US)

(73) Assignee: Trading Technologies International, Inc., Chicago, IL (US)

( * ) Notice: Subject to any disclaimer, the term of this patent is extended or adjusted under 35 U.S.C. 154(b) by 996 days.

This patent is subject to a terminal disclaimer.

(21) Appl. No.: 11/417,546

(22) Filed: May 3, 2006

(65) Prior Publication Data

US 2006/0265319 A1 Nov. 23, 2006

Related U.S. Application Data

(63) Continuation of application No. 09/289,550, filed on Apr. 9, 1999, now Pat. No. 7,212,999.

(51) Int. Cl.
*G06Q 40/00* (2006.01)

(52) U.S. Cl. .......................................... 705/37; 705/35

(58) Field of Classification Search ................... 705/37, 705/35

See application file for complete search history.

(56) References Cited

U.S. PATENT DOCUMENTS 4,674,044 A 6/1987 Kalmus et al. .............. 364/408

(Continued)

FOREIGN PATENT DOCUMENTS

| | | |
|---|---|---|
| EP | 388162 | 9/1990 |
| JP | 6028384 | 2/1994 |
| JP | 2004287819 | 10/2004 |
| WO | 92/12488 | 7/1992 |
| WO | WO 92/12488 | 7/1992 |
| WO | WO 95/26005 A1 | 9/1995 |
| WO | WO 00/52619 A1 | 9/2000 |
| WO | WO 01/75733 | 11/2001 |

OTHER PUBLICATIONS

Wright, William, Research Report Information Animation Applications in the Capital Markets, IEEE 1995.

(Continued)

*Primary Examiner*—Hani Kazimi
(74) *Attorney, Agent, or Firm*—McDonnell Boehnen Hulbert & Berghoff LLP

(57) ABSTRACT

A user interface for an electronic trading exchange is provided which allows a remote trader to view in real time bid orders, offer orders, and trades for an item, and optionally one or more sources of contextual data. Individual traders place orders on remote client terminals, and this information is routed to a transaction server. The transaction server receives order information from the remote terminals, matches a bid for an item to an offer for an item responsive to the bid corresponding with the offer, and communicates outstanding bid and offer information, and additional information (such as trades and contextual data) back to the client terminals. Each client terminal displays all of the outstanding bids and offers for an item, allowing the trader to view trends in orders for an item. A priority view is provided in which orders are displayed as tokens at locations corresponding to the values of the orders. The size of the tokens reflects the quantity of the orders. An alternate view positions order icons at a location which reflects the value and quantity of the order. Additionally, contextual data for the item is also displayed to allow the trader to consider as much information as possible while making transaction decisions. A pit panel view is also provided in which traders connected to the pit are represented by icons, and are displayed corresponding to an activity level of the trader.

19 Claims, 11 Drawing Sheets